US008341968B2

(12) United States Patent
Landers et al.

(10) Patent No.: US 8,341,968 B2
(45) Date of Patent: Jan. 1, 2013

(54) HEAT EXCHANGER, PARTICULARLY FOR USE IN A BEVERAGE DISPENSER

(75) Inventors: Jerry L. Landers, Memphis, IN (US); Charles Benjamin Miller, Louisville, KY (US)

(73) Assignee: Manitowoc Foodservice Companies, LLC, Manitowoc, WI (US)

( * ) Notice: Subject to any disclaimer, the term of this patent is extended or adjusted under 35 U.S.C. 154(b) by 704 days.

(21) Appl. No.: 12/464,593

(22) Filed: May 12, 2009

(65) Prior Publication Data
US 2009/0285956 A1 Nov. 19, 2009

Related U.S. Application Data

(60) Provisional application No. 61/053,433, filed on May 15, 2008.

(51) Int. Cl.
*F25D 17/02* (2006.01)
(52) U.S. Cl. ............................................. 62/98; 62/389
(58) Field of Classification Search .............. 62/98, 389, 62/66, 348, 396, 344, 398, 400; 426/66, 426/477; 222/146.6; 165/166, DIG. 185, 165/DIG. 186; 29/890.03
See application file for complete search history.

(56) References Cited

U.S. PATENT DOCUMENTS

| | | | |
|---|---|---|---|
| 4,463,065 A * | 7/1984 | Hegedus et al. | 429/465 |
| 4,606,495 A * | 8/1986 | Stewart et al. | 228/183 |
| 4,678,104 A * | 7/1987 | Pritchett | 222/146.6 |
| 5,226,296 A * | 7/1993 | Kolvites et al. | 62/390 |
| 5,397,032 A | 3/1995 | Landers | |
| 5,462,113 A | 10/1995 | Wand | |
| 5,484,015 A | 1/1996 | Kyees | |
| 5,743,602 A * | 4/1998 | Maddux et al. | 312/140.1 |
| 5,950,866 A | 9/1999 | Lancaster | |
| 6,681,841 B1 | 1/2004 | Dale | |
| 6,698,229 B2 | 3/2004 | Renken et al. | |
| 6,761,036 B2 | 7/2004 | Teague et al. | |
| 6,880,358 B2 | 4/2005 | Lucas et al. | |
| 6,945,070 B1 | 9/2005 | Jablonski et al. | |
| 7,032,654 B2 | 4/2006 | Wand et al. | |
| 8,087,452 B2 | 1/2012 | Goldman et al. | |

(Continued)

FOREIGN PATENT DOCUMENTS
WO WO 01/17895 3/2001

OTHER PUBLICATIONS

First Office Action Issued Apr. 11, 2012 in Corresponding Chinese Application for Invention No. 200910149785.8.

*Primary Examiner* — Mohammad Ali
(74) *Attorney, Agent, or Firm* — Ohlandt, Greeley, Ruggiero & Perle, L.L.P.

(57) ABSTRACT

A method of cooling multiple beverage components involves: providing a heat exchanger comprising a plurality of sheets of heat transfer material and at least first and second flow channels defined by surfaces made at least in part by the sheets of heat transfer material; directing a first and second fluid respectively through the first and second flow channels, each of the first and second fluids being selected from the group consisting of non-carbonated water, carbonated water, beverage concentrates and non-concentrated beverages; placing ice in contact with at least one of the sheets of heat transfer material.

26 Claims, 17 Drawing Sheets

U.S. PATENT DOCUMENTS

| | | |
|---|---|---|
| 2003/0101735 A1* | 6/2003 | Teague et al. .................. 62/70 |
| 2003/0230108 A1* | 12/2003 | Lucas et al. ................... 62/344 |
| 2004/0168465 A1 | 9/2004 | Renken et al. |
| 2004/0188078 A1* | 9/2004 | Wu et al. ..................... 165/183 |
| 2006/0011333 A1* | 1/2006 | Emrich et al. ................ 165/167 |
| 2006/0108100 A1* | 5/2006 | Goldman et al. ............ 165/80.4 |
| 2006/0112719 A1* | 6/2006 | Pfeifer et al. ................. 62/389 |
| 2007/0188991 A1* | 8/2007 | Wilson et al. ................ 361/699 |

\* cited by examiner

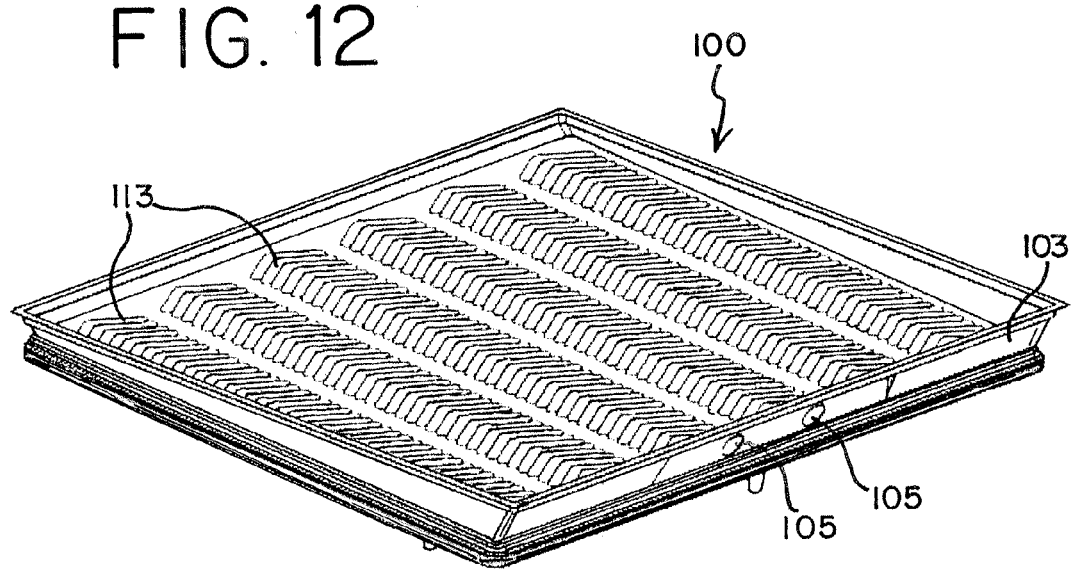
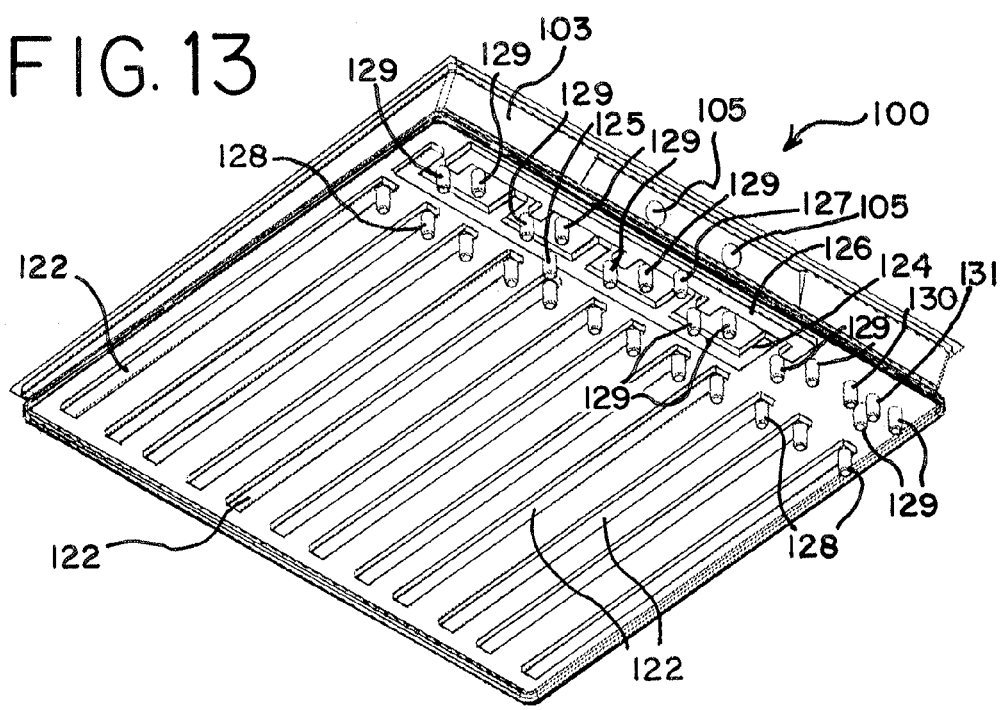

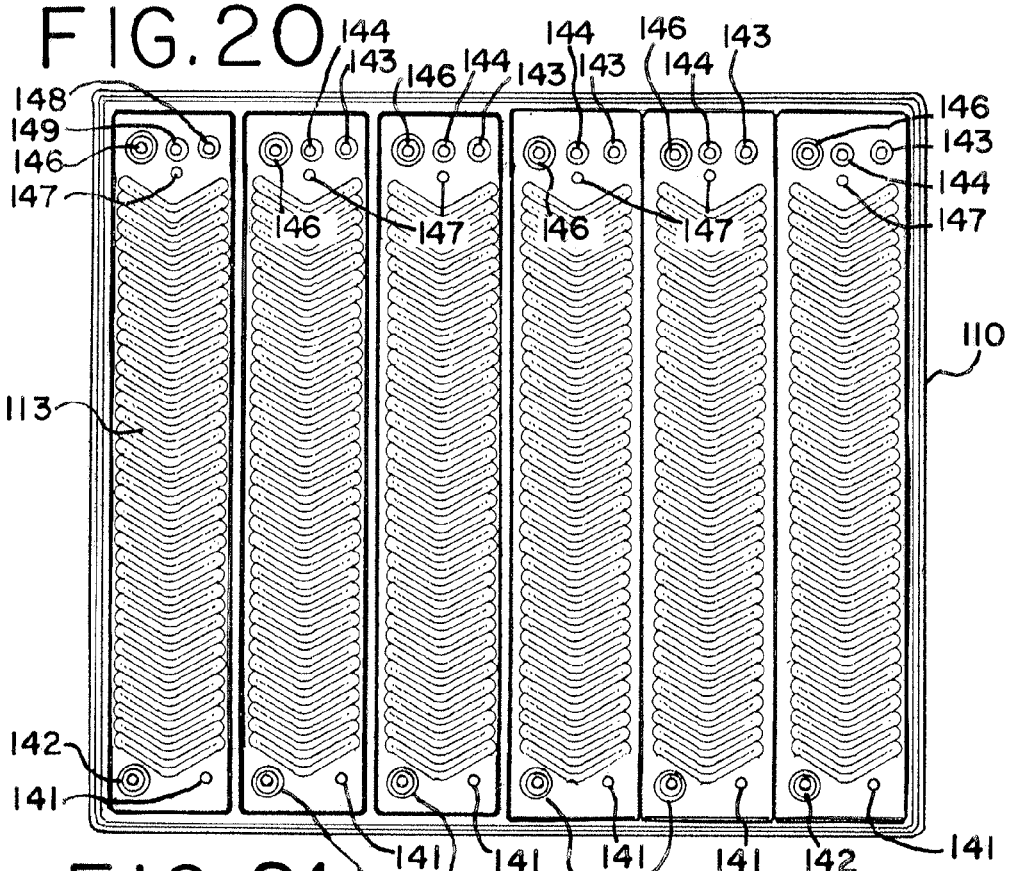
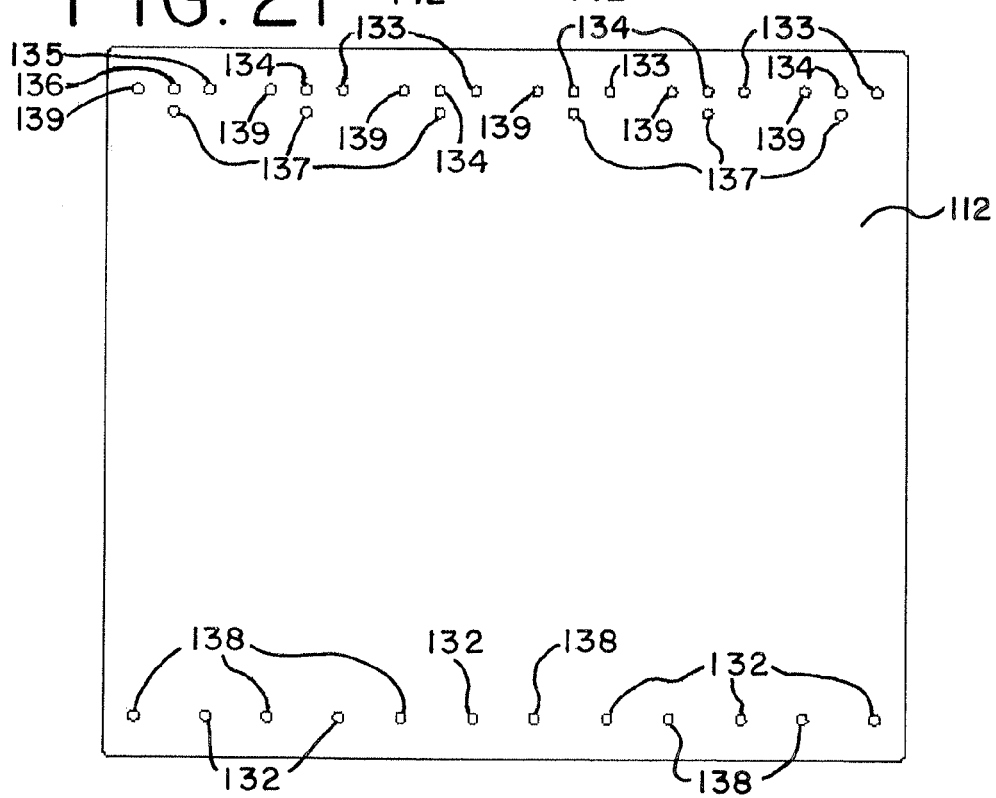

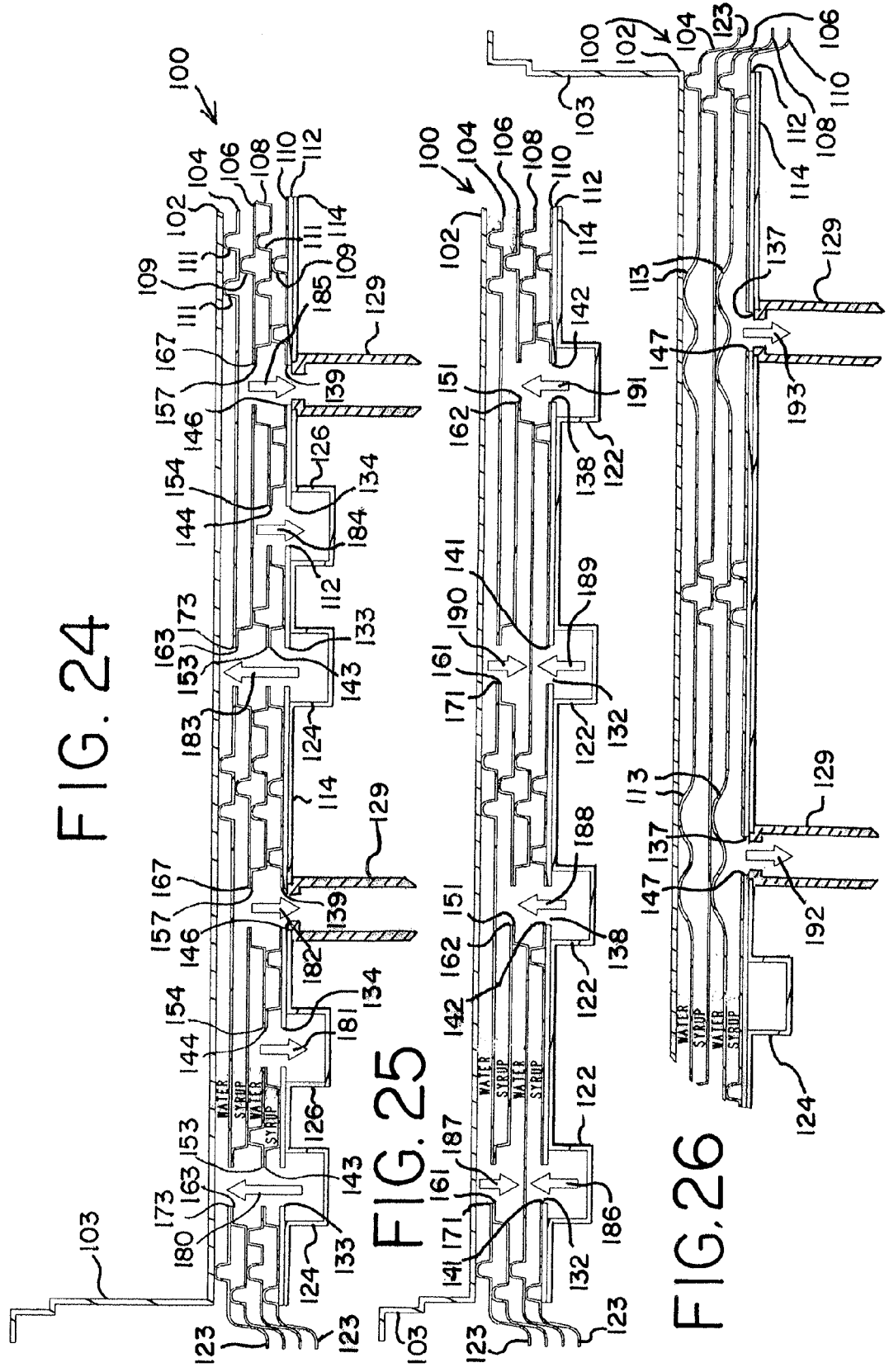

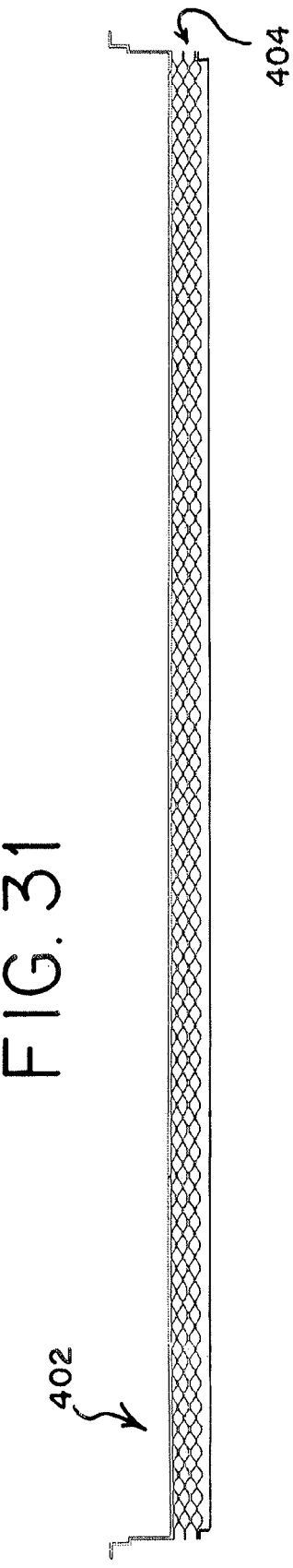
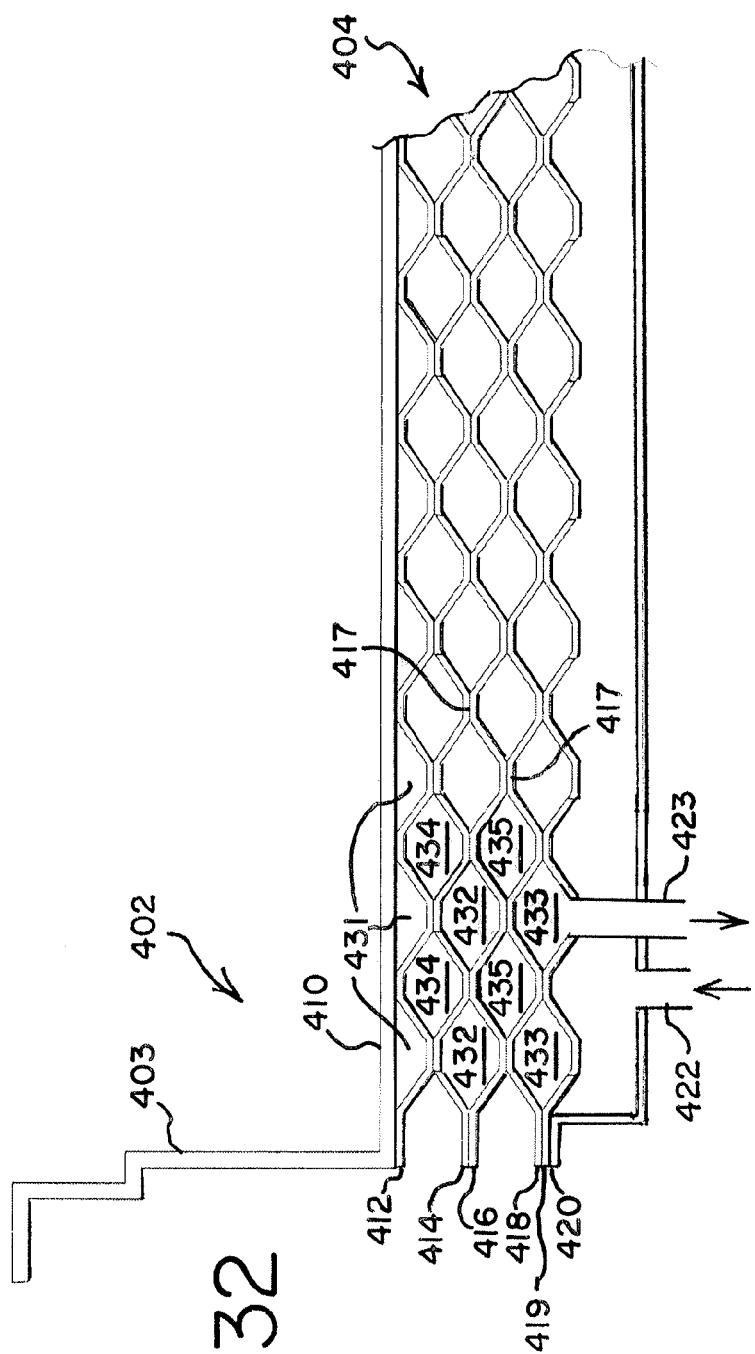
FIG. 31
FIG. 32

HEAT EXCHANGER, PARTICULARLY FOR USE IN A BEVERAGE DISPENSER

REFERENCE TO EARLIER FILED APPLICATIONS

The present application claims the benefit of the filing date under 35 U.S.C. §119(e) of Provisional U.S. Patent Application Ser. No. 61/053,433, filed May 15, 2008; which is hereby incorporated by reference in its entirety.

BACKGROUND

The present invention relates to a heat exchanger, such as a heat exchanger used in a beverage dispenser, and particularly to a heat exchanger that uses ice to cool components for beverages dispensed by the beverage dispenser. The invention also relates to an improved beverage dispenser utilizing a heat exchanger, methods of cooling beverages and beverage components, and methods of constructing a heat exchanger.

Many consumers desire cold beverages. As a result, beverage dispensers have been developed that have a variety of different ways of cooling the beverage or its components, such as carbonated water and a syrup concentrate, before the beverage is dispensed. Some dispensers have a refrigeration system, including a compressor and evaporator, to cool the beverage. One class of dispensers rely on melting ice contained in an ice bin to cool the beverage components. An example of such a dispenser is disclosed in U.S. Pat. No. 5,397,032. This class of dispensers will also often be equipped with an ice dispenser, so that customers who wish to have ice in their beverages can conveniently dispense ice from the ice bin into their beverage cup. Such an ice and beverage dispenser is disclosed in U.S. Pat. No. 6,880,358.

In this class of machines, a typical dispenser will have a heat exchanger in the form of a cold plate located at the bottom of an ice bin. Ice in contact with the cold plate melts to keep the cold plate cooled. Ice is added to the ice bin to replace that which melts. The ice can be added in a manual operation, being hauled to the dispenser from an ice storage bin located elsewhere in the facility, or an automatic ice making machine can be positioned over the dispenser so that ice formed by the ice machine falls into the dispenser ice bin to keep it full. U.S. Pat. No. 6,761,036 discloses a beverage dispenser with an integral ice maker.

The cold plate typically comprises a coil basket made of several stainless steel tubes embedded in a block of aluminum. The aluminum provides a good heat transfer between the melting ice and the fluids carried in the tubing in the cold plate. The cold plate has a surface shaped to allow for drainage of the melting water. U.S. Pat. No. 5,484,015 discloses such a cold plate type of heat exchanger.

While this type of heat exchanger has seen wide spread usage and performs very well, there have been attempts to find other ways to cool beverage components in a beverage dispenser using ice as the cooling medium, perhaps because of the cost and weight of a typical aluminum cold plate. For example, see U.S. Pat. No. 5,950,866. However, such devices have not gained widespread acceptability. Thus there is still a need for a heat exchanger that weighs less and costs less than an aluminum block type of cold plate for use in a beverage dispenser. Each of the above listed patents is hereby incorporated by reference.

BRIEF SUMMARY

The present invention involves several different aspects, all producing different benefits to heat exchanges and beverage dispensers and methods of use thereof. A heat exchanger has been invented which is made from a plurality of sheets of heat transfer material. Multiple fluid flow channels are provided in the heat exchanger to cool a plurality of beverages or beverage components. The top surface of the heat exchanger is contacted by ice, and the structure of the heat exchanger is such that the cooling effect of the melting ice is used to cool each of the different fluids passing through the flow channels. This type of construction allows for a heat exchanger that is lighter in weight and less expensive to produce compared to an aluminum block type cold plate capable of cooling the same number of different beverage components at the same flow rates.

In a first aspect, the invention is a method of cooling multiple beverage components comprising: providing a heat exchanger comprising a plurality of sheets of heat transfer material and at least first and second flow channels defined by surfaces made at least in pair by said sheets of heat transfer material; directing a first and second fluid respectively through the first and second flow channels, each of the first and second fluids being selected from the group consisting of non-carbonated water, carbonated water, beverage concentrates and non-concentrated beverages; placing ice in contact with at least one of the sheets of heat transfer material; and melting the ice and thereby cooling the first and second fluids as they reside in and pass through their respective channels.

In a second aspect, the invention is an improved beverage dispensing system comprising a plurality of beverage dispensing valves and a heat exchanger that is configured to cool beverage components dispensed through the valves by the melting of ice in contact with the heat exchanger, the improvement comprising: the heat exchanger comprising a plurality of sheets of heat transfer material and at least first and second flow channels defined by surfaces made at least in part by said sheets of heat transfer material.

In a third aspect, the invention is a beverage dispenser comprising at least one beverage dispensing nozzle; an ice storage bin; and a heat exchanger located at the bottom of the ice storage bin, the heat exchanger comprising a plurality of sheets of heat transfer material and at least first and second flow channels defined by surfaces made at least in part by said sheets of heat transfer material.

In a fourth aspect, the invention is a method of cooling beverage components comprising: a) providing a heat exchanger comprising a plurality of sheets of heat transfer material and at least first, second, third and fourth flow channels defined by surfaces made at least in part by said sheets of heat transfer material; b) directing carbonated water through said first flow channel, non-carbonated water through said third flow channel, a first beverage concentrate through said second flow channel and a second beverage concentrate through said fourth flow channel; c) placing ice in contact with at least one of the sheets of heat transfer material; and d) melting the ice and thereby cooling the non-carbonated water, carbonated water, first beverage concentrate and second beverage concentrate as they reside in and pass through their respective channels.

In a fifth aspect, the invention is a heat exchanger for cooling multiple beverage components comprising: a) at least first, second and third sheets of heat transfer material arranged in a generally parallel relationship and sealed together at their periphery; b) at least one first divider located between the first and second sheets of heat transfer material so as to form at least first and second distinct flow channels in the space between the first and second sheets; c) at least one second divider located between the second and third sheets so as to form at least third and fourth distinct flow channels in the space between the second and third sheets; and d) connections configured to connect first and second water lines and first and second beverage concentrate lines respectively to the first, second, third and fourth flow channels.

In a sixth aspect, the invention is a method of constructing a heat exchanger for cooling multiple fluids comprising: a) providing at least first, second and third sheets of heat transfer material in a stacked relationship, with the second sheet between the first and third sheets, leaving a first space between the first and second sheets and a second space between the second and third sheets; b) providing at least one divider forming at least first and third distinct passageways in the first space, and at least one divider forming at least second and fourth distinct passageways in the second space; and c) providing inlet and outlet connections in fluid communication with the distinct passageways in the first and second spaces.

In a seventh aspect, the invention is a method of constructing a heat exchanger comprising: a) providing at least first, second and third sheets of heat transfer material; b) forming at least two distinct passageways in a fourth sheet of material; c) forming at least two distinct passageways in a fifth sheet of material; d) sandwiching the fourth sheet of material between the first and second sheets of heat transfer material such that the passageways in the fourth sheet of material form first and second fluid flow channels; and e) sandwiching the fifth sheet of material between the second and third sheets of heat transfer material such that the passageways in the fifth sheet of material form third and fourth fluid flow channels.

In an eighth aspect, the invention is a method of constructing a heat exchanger for cooling one or more beverage components comprising the steps of: a) stamping a sheet of heat transfer material into a form with ridges and depressions; b) connecting the stamped sheet of heat transfer material onto a surface of an ice storage bin with a heat conductive connection such that the ridges are attached to a surface of the bin and the depressions form flow channels formed in part by the surface of the ice bin, and c) connecting fittings to the heat transfer material in fluid connection with the flow channels.

In a ninth aspect, the invention is a method of constructing a heat exchanger for cooling one or more beverage components comprising the steps of: a) stamping a sheet of heat transfer material into a form with ridges and depressions; b) connecting the stamped sheet of heat transfer material onto a second sheet of heat transfer material such that the depressions form flow channels formed in part by the surfaces of the sheets of heat transfer material; c) connecting the second sheet of heat transfer material to a surface of an ice storage bin with a heat conductive connection of the ice bin, and d) connecting fittings to the heat transfer material in fluid connection with the flow channels.

The preferred embodiment of the heat exchanger of the present invention may be made out of several sheets of stamped metal, such as aluminum, and then brazed together with an aluminum based brazing material. The shape of the stamping forms channels between the sheets and also preferably forms dividers to hold the sheets apart. The sheets of stamped metal weigh less and have less material costs than the comparable aluminum cold plate with the same number of separate flow channels. The stamping and brazing operations are lower in cost than the cost of the foundry operation used to make an equivalent aluminum cold plate. Thus the finished cost of the heat exchanger of the present invention is lower than the cost of a comparable cold plate.

These and other advantages of the invention, as well as the invention itself, will be more easily understood in view of the attached drawings.

BRIEF DESCRIPTION OF THE DRAWINGS

FIG. 12 is a top perspective view of a second embodiment of a heat exchanger used in the dispenser of FIG. 1.

FIG. 13 is a bottom perspective view of the heat exchanger of FIG. 12.

FIG. 20 is a top plan view of the fifth sheet in the heat exchanger of FIG. 12.

FIG. 21 is a top plan view of the sixth sheet in the heat exchanger of FIG. 12.

FIG. 24 is a cross-sectional view taken along line 24-24 of FIG. 23.

FIG. 25 is a cross-sectional view taken along line 25-25 of FIG. 23.

FIG. 26 is a cross-sectional view taken along line 26-26 of FIG. 23.

FIG. 31 is a schematic cross-section view of the heat exchanger portion of a third alternate embodiment of an ice and beverage dispenser.

FIG. 32 is an enlarged cross-sectional view of the embodiment of FIG. 31.

DETAILED DESCRIPTION OF THE DRAWINGS AND THE PRESENTLY PREFERRED EMBODIMENTS

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Several terms used in the specification and claims have a meaning defined as follows.

The term "sheet" means a piece of material that has a generally uniform thickness which is significantly less than either its width or breadth. While many sheets are formed in a substantially flat shape to begin with, stamping operations may add non-flat features to the sheet, but do not significantly increase its thickness at any given point.

The term "heat transfer material" is meant to designate a material, either a single species or a composite, such as a laminate material, that has a thermal conductivity of at least 5 BTU/(hr-ft-° F.) (8.7 watts/(m-° K.)).

The term "beverage component" is meant to designate a fluid that is consumed by humans, either full strength or after being mixed together with another fluid. Single component beverages include beer, which is typically cooled and dispensed from a source having the same composition as the beverage when consumed. Many beverage dispensers mix water (either carbonated or non-carbonated) with different concentrated syrups to make different beverages. The concentrates often contain a sweetener and a flavor, and are formulated to be mixed with carbonated water to form a carbonated soft drink. The non-carbonated and carbonated water, as well as the syrups, are beverage components. Many dispensers that dispense combined water-syrup beverages also dispense plain water, which would also be considered a beverage component in the present invention.

The term "paddlewheel" is meant to cover any structure used in an ice bin to move ice in the bin to a point where the ice is dispensed from the bin. Paddlewheels may be mounted to turn in an inclined plane or have other orientations.

The term "distinct passageway" means that fluid passing through the passageway will not mix with other fluids. A "distinct passageway" may have several branches, and fluid passing through the passageway may take one or the other of these branches and mix back with fluid that traveled a different branch, but this fluid is prevented from physically mixing with another fluid in a separate "distinct passageway" in the heat exchanger. A distinct passageway may begin and end at connection points to the heat exchanger, or may have an end point inside the heat exchange. In this fashion, several distinct passageways may be formed between an inlet manifold and an outlet manifold within the heat exchanger.

Figure 1:
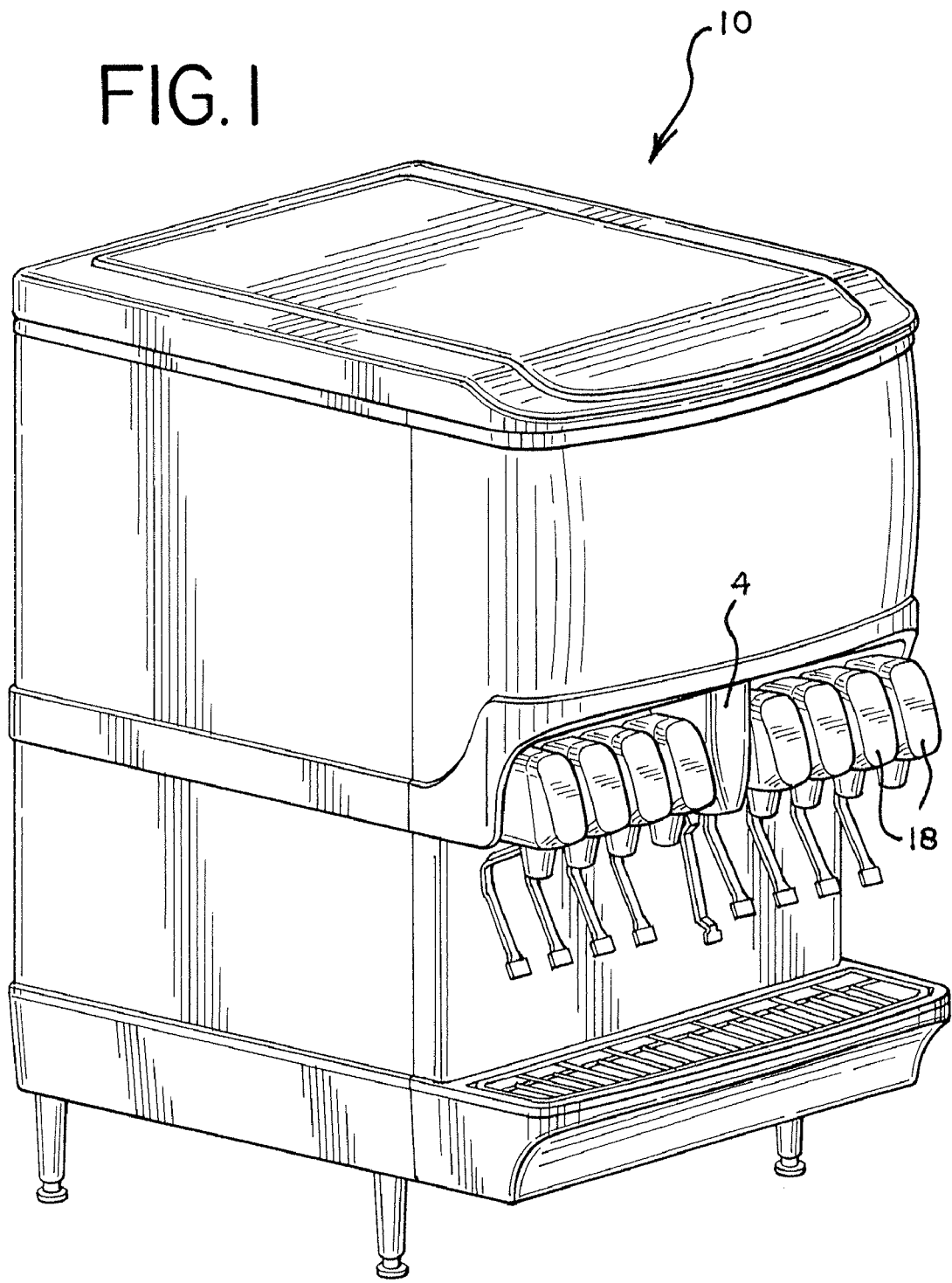
FIG. 1 is a side perspective view of a combined ice and beverage dispenser utilizing the present invention.
Figure 2:
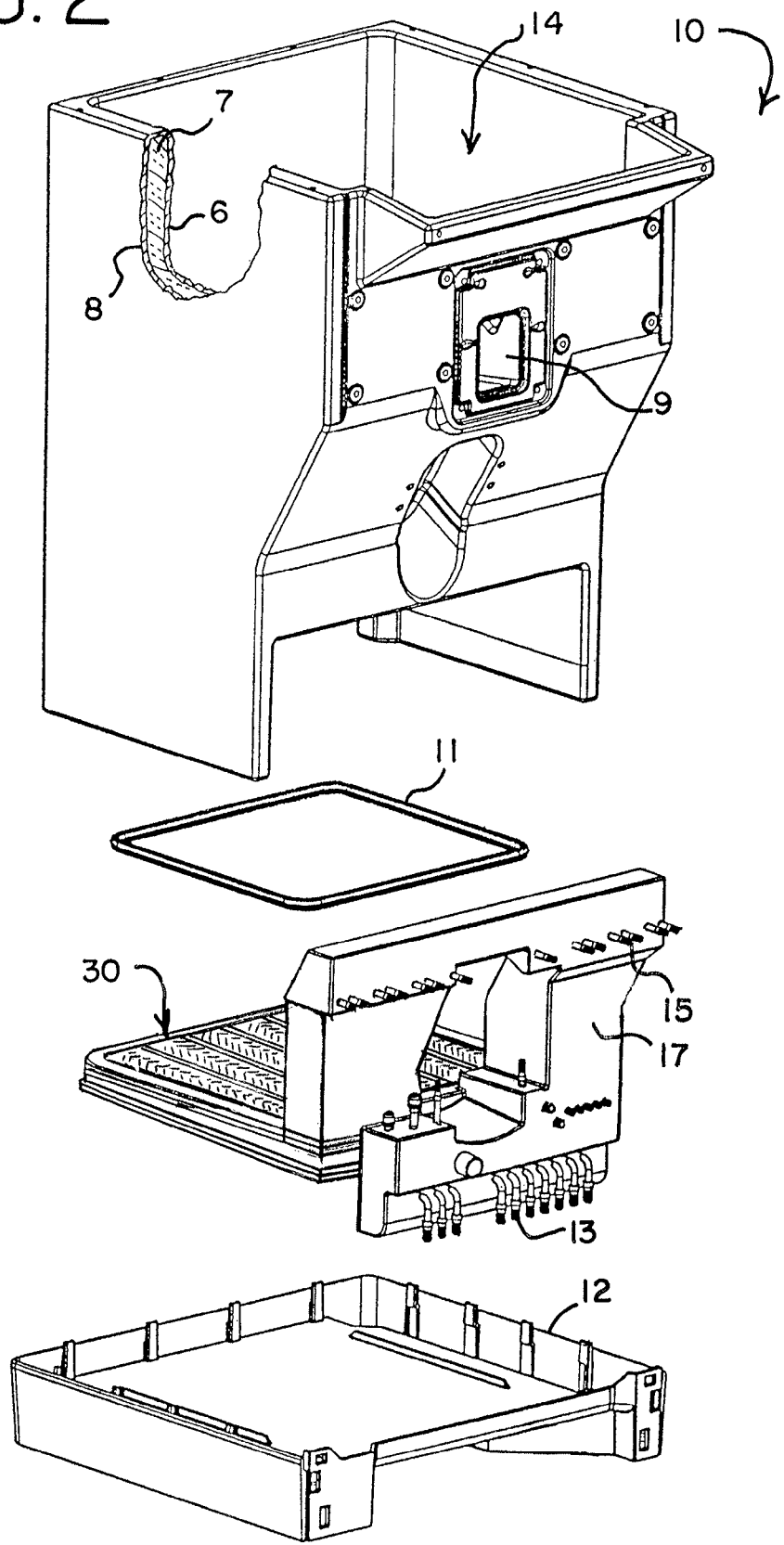
FIG. 2 is an exploded, partial broken away, view of the dispenser of FIG. 1 with several components removed for sake of clarity.
Figure 3:
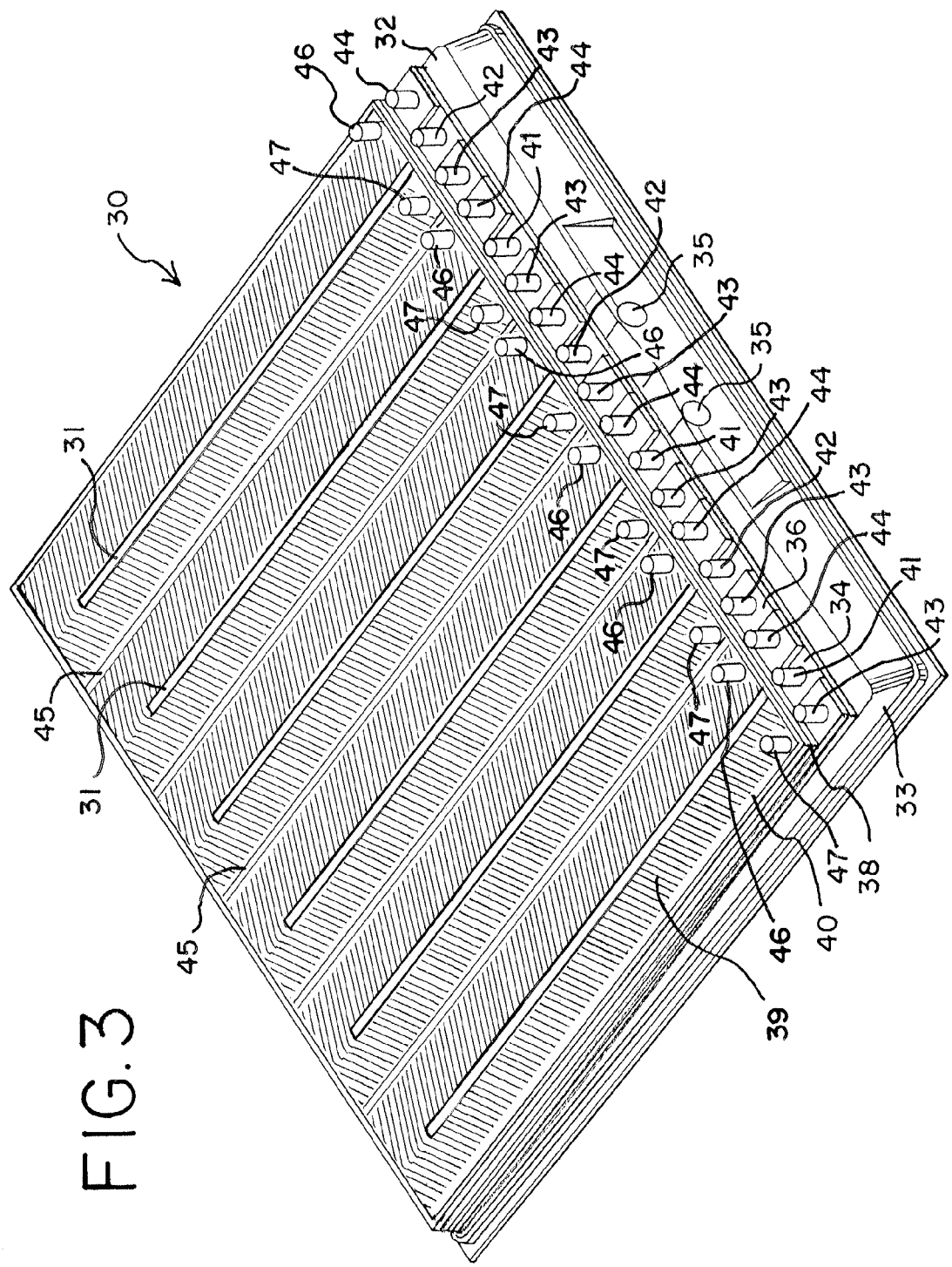
FIG. 3 is a bottom perspective view of a first embodiment of a heat exchanger used in the dispenser of FIG. 1.

A first embodiment of a beverage dispensing system 10, capable of dispensing both ice and beverages, is shown in FIG. 1. Important details of the dispenser, as shown in the exploded view of FIG. 2, include an ice bin 14, heat exchanger 30, and base 12. Ice bin 14 interfaces with heat exchanger 30 via gasket 11. Ice bin 14 may be formed with hollow walls which are later filled with foam. The ice bin 14 comprises an inner wall 6, a foam layer 7, and an outer wall 8.

In this embodiment, where the beverage dispenser is combined with an ice dispenser, the ice storage bin comprises an ice dispensing aperture 9 and the dispenser includes an ice dispensing chute 4 connected to the storage bin in proximity to the ice dispensing aperture 9. At least one paddlewheel (not shown) is located in the ice storage bin and is configured to lift ice to the ice dispensing aperture in a conventional manner. Other items typically found in a beverage dispenser that can be included in the beverage dispensing system 10 include a carbonator (not shown) and a circulating pump (not shown).

Heat exchanger 30 may be attached to other housing components of the dispensed, and mounts atop base 12. Tubing 13 connects sources of beverage components to the heat exchanger 30. Other tubing 15 conveys beverage components from the heat exchanger 30 to a plurality of mixing and dispensing valves 18 (FIG. 1) for proportioning and mixing the syrup and water and dispensing the resultant flow through a beverage dispensing nozzle. In some embodiments, water-only may be dispensed, and in some embodiments, a pre-mixed or single-component beverage (e.g. beer or tea) may be dispensed. The tubing 13 and 15 (along with other components commonly found in beverage dispensers) may be encased in foam insulation 17.

A first embodiment of a heat exchanger 30 made according to the present invention is shown in FIGS. 3-8. The heat exchanger 30 is configured to cool beverage components by the melting of ice in contact with the heat exchanger. In this embodiment, the valves and heat exchanger are part of a single piece of dispensing equipment, and the ice is contained in the piece of dispensing equipment in contact with the heat exchanger. The heat exchanger 30 is cooled by melting ice in the bottom of the ice bin 14. Heat is transferred to the ice from components of the beverages that are dispensed by the ice/beverage dispenser 10. Heat is transferred by passing water (plain or carbonated), a single component beverage or a concentrated beverage syrup through a flow channel in the heat exchanger 30. The heat exchanger 30 has multiple flow channels, each carrying a separate beverage or beverage component. The flow channels are connected to the tubing 13 and 15. As will be discussed below, in some embodiments, a manifold built into the heat exchanger may allow one inlet line to feed several different distinct passageways through the heat exchanger.

A preferred heat exchanger 30 comprises a plurality of sheets of heat transfer material and at least first and second flow channels defined by surfaces made at least in part by the sheets of heat transfer material. The heat exchanger will comprises at least first and second sheets of heat transfer material, and the first and second flow channels are formed between the first and second sheets. Preferably the heat exchanger has at least first, second and third sheets 32, 34, 36, (FIG. 4) of heat transfer material that are substantially flat, arranged in a generally parallel relationship and sealed together at their periphery; and at least one first dividers located between the first and second sheets of heat transfer material so as to form at least first and second flow channels in the space between the first and second sheets. A second divider is preferably located between the second and third sheets so as to form at least third and fourth flow channels in the space between the second and third sheets. In this embodiment, the dividers are provided by portions of one or more of the first, second and third sheets, particularly by an upstanding portion formed from the second and third sheets.

The heat exchanger 30 further comprises fourth and fifth sheets of heat transfer material 38 and 40, and dividers between the third and fourth sheets and between the fourth and fifth sheets to form additional flow channels. Connections 41, 42, 43, 44, 46 and 47 are provided on the heat exchanger 30 and are configured to connect water lines and beverage concentrate lines respectively to the various flow channels. The connections 41, 43 and 47 allow fluid to enter respective flow channels, and connectors 42, 44 and 46 are outlet connectors. The flow channels run from the front to the back, and from the back to the front, of the heat exchanger. As explained in more detail below, holes 48 and 49 formed in strategic places in some of the sheets allow for transverse passageways between sheets. The beverage concentrate passageways include a front-to-back and return flow all in one level. The water passageways flow front-to-back on alternating spaces on one level and back-to-front on alternating spaces on another level.

Figure 4:
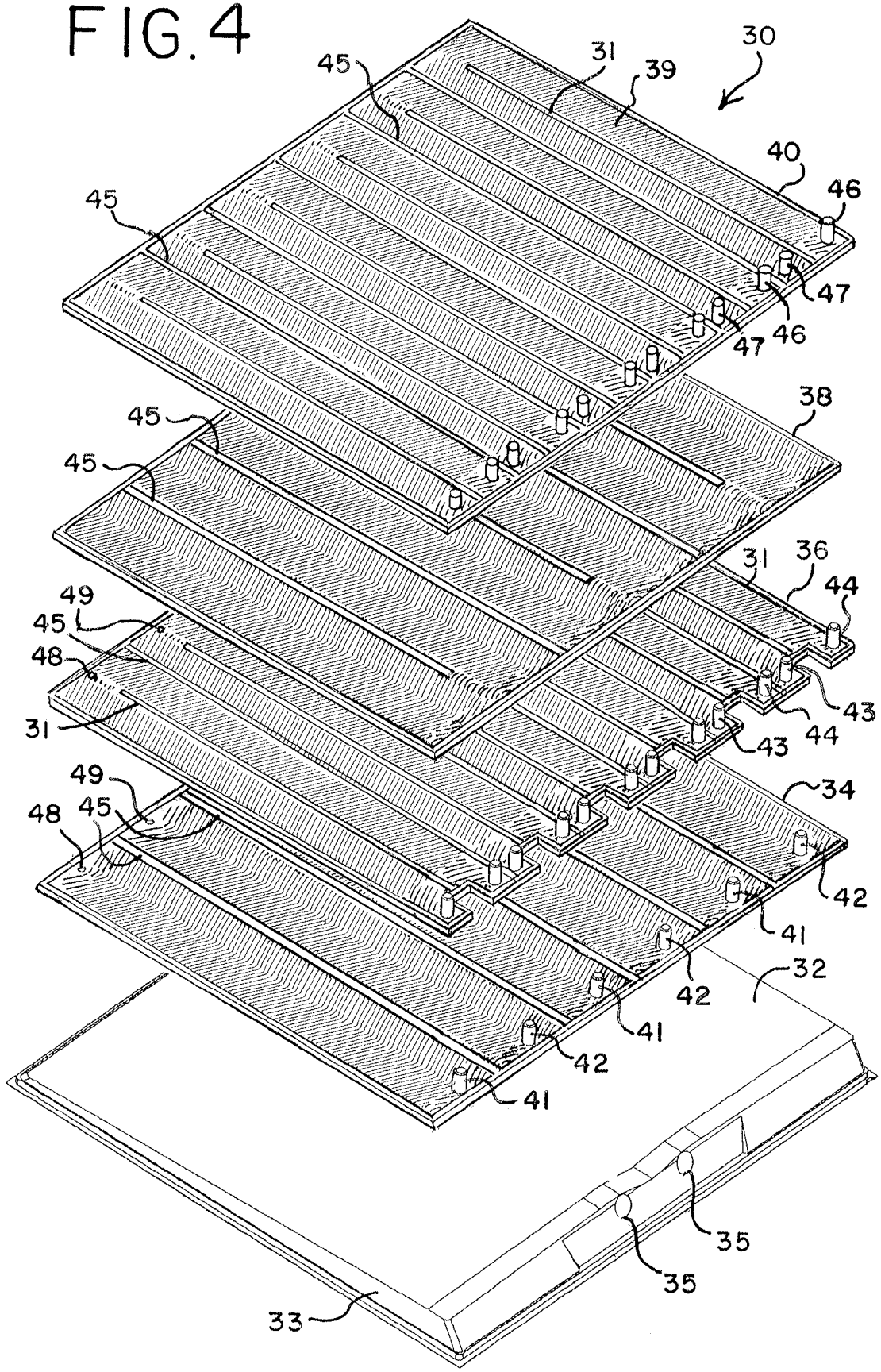
FIG. 4 is an exploded view of the heat exchanger of FIG. 3.

The first sheet 32 also forms the bottom of the ice bin 14. To properly hold the ice while it melts, the first sheet includes a flange 33 around its perimeter and extending away from the second sheet 34. The first sheet 32 includes at least one, and preferably two melt water drain holes 35 through the flange 33. The main surface of sheet 32 may be flat as shown in FIG. 4, whereas the other sheets 34, 36, 38 and 40 preferably include depressions 39 in the form of chevrons.

Figure 5:
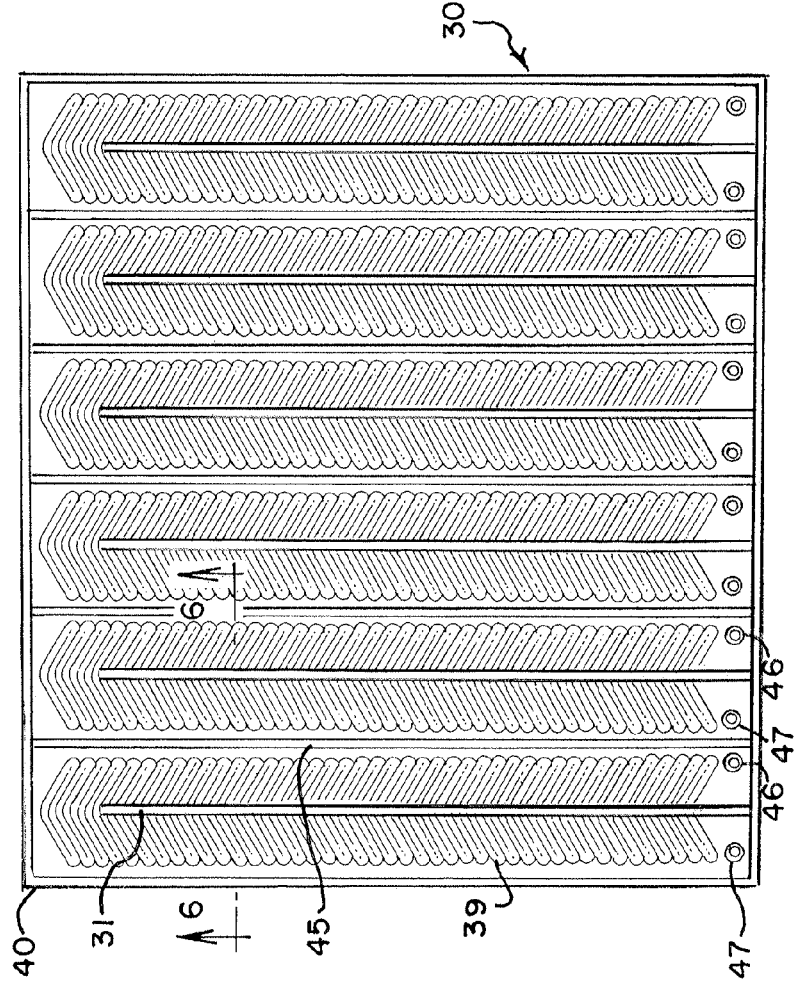
FIG. 5 is a bottom plan view of the bottom sheet of the heat exchanger of FIG. 3.
Figure 6:
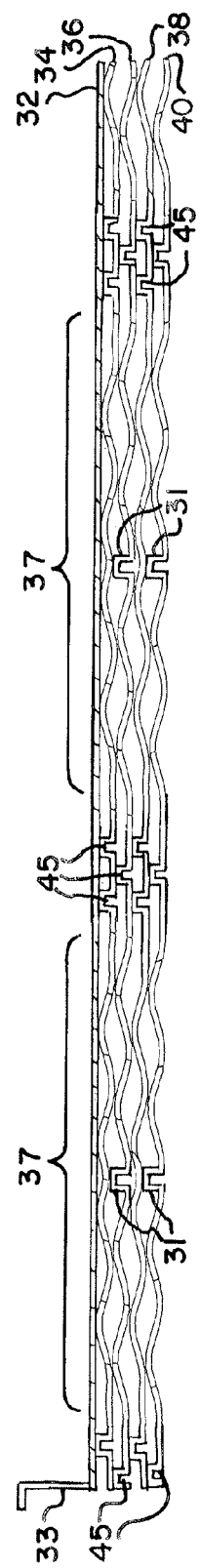
FIG. 6 is a cross-sectional view taken along line 6-6 of FIG. 5, showing all of the sheets in the heat exchange of FIG. 3.
Figure 7:
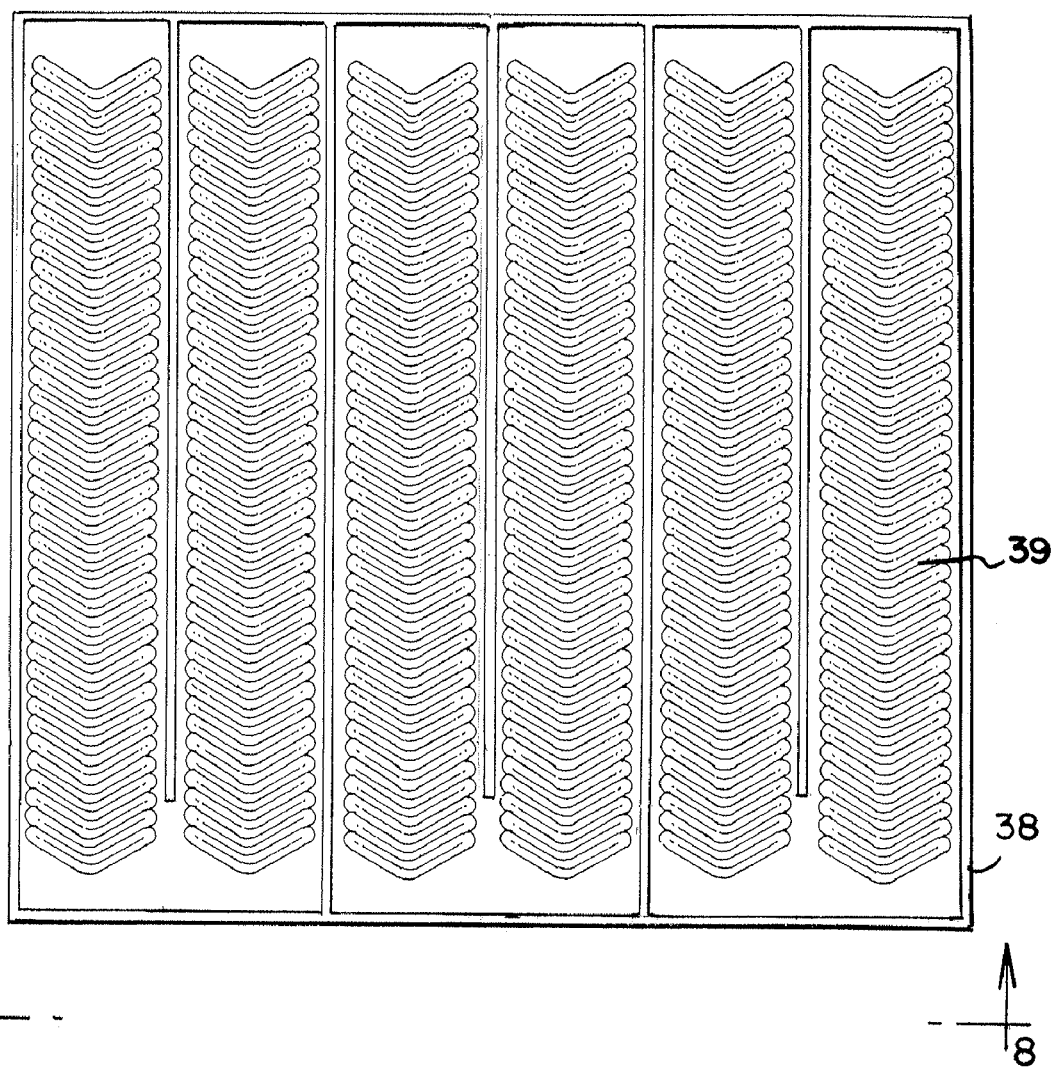
FIG. 7 is a top plan view of one of the stamped sheets used in the heat exchanger of FIG. 3.
Figure 8:
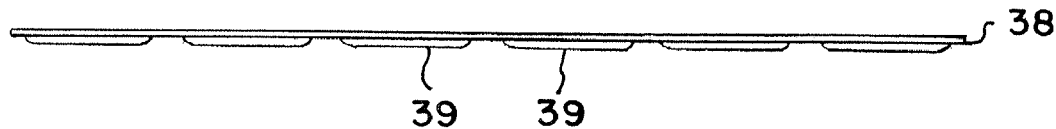
FIG. 8 is an end view taken along line 8-8 of FIG. 7.

FIG. 5 shows a bottom plan view of sheet 40, and FIG. 6 shows a cross-sectional view of the heat exchanger 30. The upstanding portions 45 of the sheets 34, 36, 38 and 40, providing dividers between flow channels, are made by stamped embosses, and are flat across their extended sections, to mate with flat sections between rows of chevrons in the adjacent sheet. The chevron shaped depressions 39 in sheets 34, 36, 38 and 40 form regions 37 (FIG. 6) of undulating sheet material between the embossed projections 45. Since these regions form the flow channels, the depressions 39 form flow inhibitors in the flow channels. It should be noted that the contacts between chevrons in adjacent sheets, seen in the cross section of FIG. 6, are point contacts, and directly in front and behind the point contacts there will be space where fluid can flow. FIGS. 7 and 8 show a plan and end elevation view of sheet 38.

The water flow paths enter through inlets 41 and fill half of the spaces between sheets 32 and 34 formed by the dividers 45. The water flows to the back of the heat exchanger 30 where it passes through holes 48 in sheets 34 and 36. This brings the water to the level between sheets 36 and 38, where it flows back to the front of the heat exchanger 30 in half of the spaces. As can be seen in FIG. 4, three dividers 45 in sheet 38 do not extend all the way up to the front of the sheet. As a result, water can pass between the spaces and enter the adjacent space, where it travels back to the real of the heat exchanger in the space between sheets 36 and 38, through holes 49, and back to the other half of the spaces between sheets 32 and 34, where it flows back to the front and exits through outlet fittings 42.

The beverage concentrate flow paths are simpler, as they stay all in one level of the heat exchanger. As seen in FIG. 4, the space between sheets 34 and 36 is divided up into six spaces that each has an inlet 43. However, there are dividers 31 that bisect the flow paths so that syrup flows from the front of the heat exchanger to the back along one side of the space, then around the end of the dividers 31 and back to the front of the heat exchanger 30, where the beverage concentrate exits outlets 44. Six beverage concentrates can thus be cooled between sheets 34 and 36. Another six beverage concentrates can be cooled in the spaces between sheets 38 and 40, entering inlets 47 and exiting outlets 46.

Figure 9:
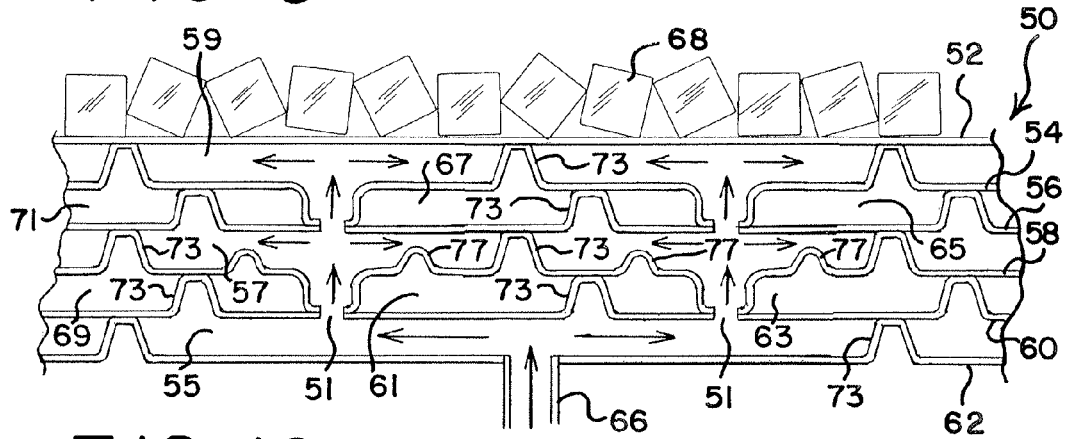
FIGS. 9, 10 and 11 are schematic cross-sectional views of portions of heat exchangers similar to the heat exchanger of FIG. 3 showing the structure of connections between sheets surrounding pass-through holes.

FIG. 9 is a schematic view of another heat exchanger 50 made from sheets 52, 54, 56, 58, 60 and 62, much like heat exchanger 30. Upstanding projections 73 divide the space between the sheets into flow passageways. The two most bottom sheets 60 and 62 form a manifold layer, so that water can enter though one fitting 66 and be distributed throughout the heat exchanger. The manifold layer provides chambers that split flow between multiple circuits in parallel. This figure also shows traverse passageways 51 formed between sheets of heat transfer material, and schematically how water is cooled by the ice 68 resting on a heat exchanger 50. In FIG. 9, water enters through inlet 66 into a flow channel 55 provided between sheets 62 and 60. Other flow channels 57 and 59 are formed between sheets 58 and 56, and between sheets 54 and 52, respectively. A hole in sheet 60 matches up with a hole in sheet 58 to provide a transverse passage 51 between flow channel 55 and flow channel 57. Similar holes in sheets 56 and 54 are aligned to provide a second transverse passageway 51 between flow channel 57 and flow channel 59. Water flowing through channel 59 can give off heat to the melting ice 68 resting on sheet 52. Other transverse passageways, not shown, allow the cooled water to flow back into other passageways (not shown) between the sheets and eventually to an outlet (not shown). While the water is flowing, it helps to transfer heat from one or more beverage syrups that are flowing through channels 61, 63, 65, 67, 69 and 71, thus cooling the syrups before they are dispensed with the water to make a beverage. Obstructions 77 may be formed in the sheets to control flow rates through different passageways to make a more balanced flow.

Figure 10:
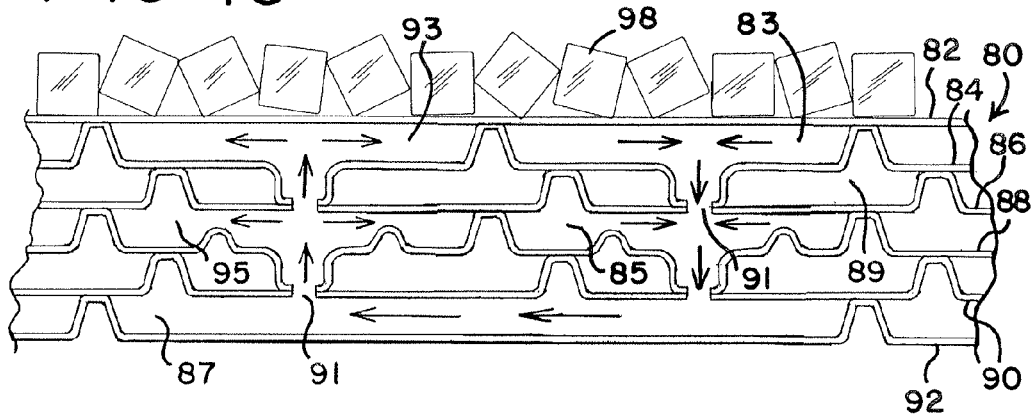

FIG. 10 shows a schematic view of a similar heat exchanger 80 where the cooling circuits are arranged in series and water is cooled by melting ice 98. The heat exchanger 80 is made with sheets 82, 84, 86, 88, 90 and 92. In this embodiment, the manifold layer 87 between sheets 90 and 92 links multiple cooling circuits in series. The water flows across the heat exchanger 80 in one direction in flow channels 83 and 85, passes to the manifold area 87 through transverse passageways 91, travels through additional transverse passageways 91 to be routed back in the other direction across the heat exchanger in flow channels 93 and 95. The flowing water is used to cool syrup in channels formed between the sheets, such as channel 89 formed between sheets 84 and 86. The water inlet and outlet to heat exchanger 80 are not shown in FIG. 10, but could be formed by an inlet connected to flow channel 83 and an outlet connected to flow channel 93. The transverse passageways 91 distribute incoming water from flow channel 83 to flow channel 85, and direct water from flow channel 95 into flow channel 93, before exiting from the heat exchanger.

Figure 11:
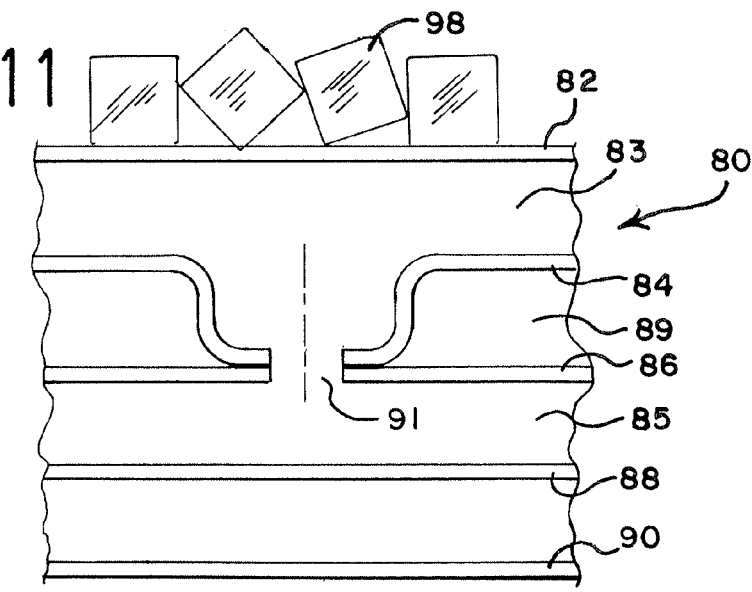

FIG. 11 shows, in detail, a transverse passageway 91 of heat exchanger 80 used to get water from passageway 83 into passageway 85. Sheet 84 and 86 both have a hole formed in them. Sheet 84 is stamped in the area around the hole with a ring shaped emboss. When the heat exchanger is assembled, brazing material (not shown) seals sheet 84 and 86 together in the area surrounding the aligned holes. In this way water can pass from flow channel 83, though a layer carrying syrup (formed between sheets 84 and 86) to flow channel 85 without mixing with the syrup in channel 89.

Figure 14:
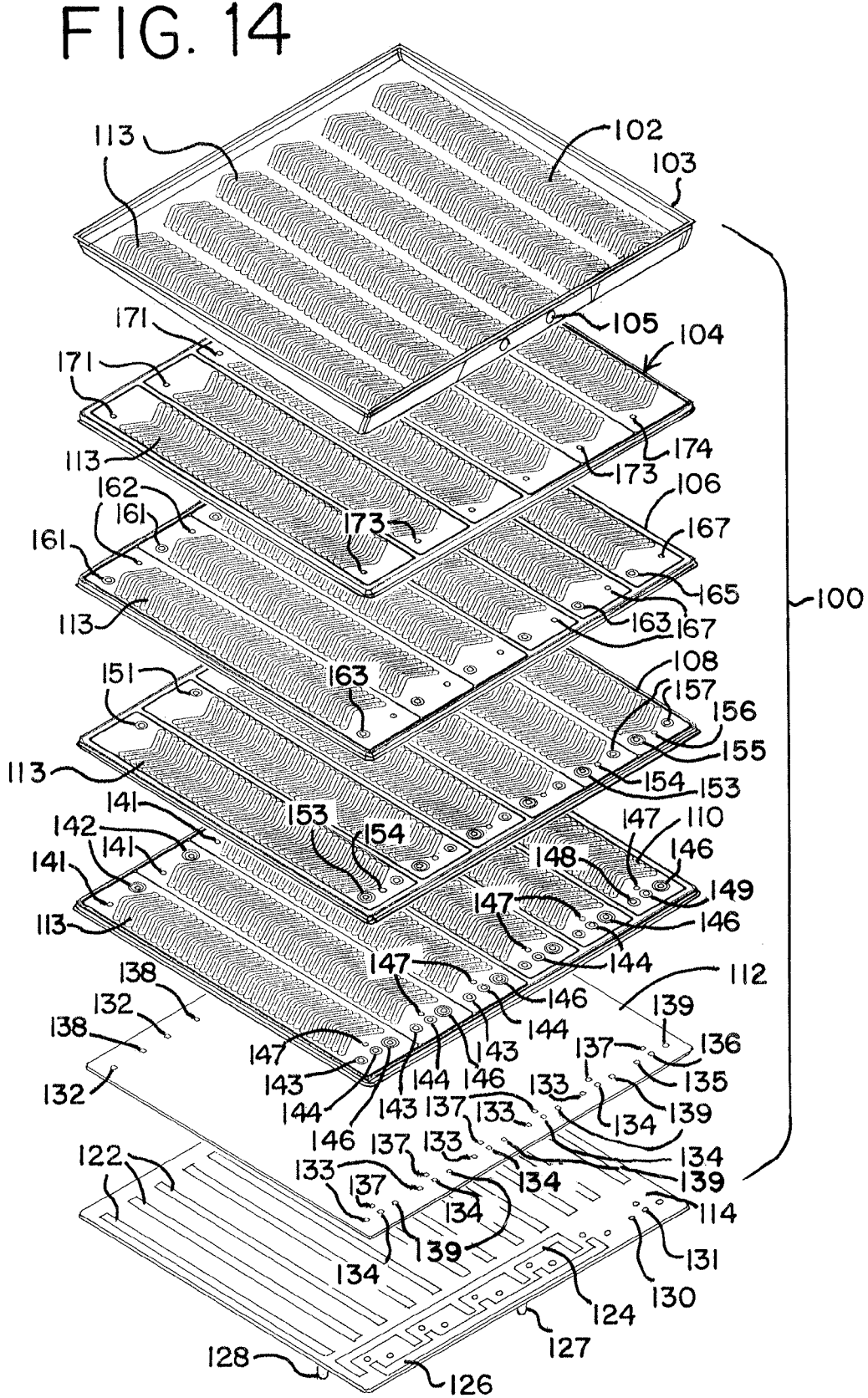
FIG. 14 is an exploded view of the heat exchanger of FIG. 12.
Figure 15:
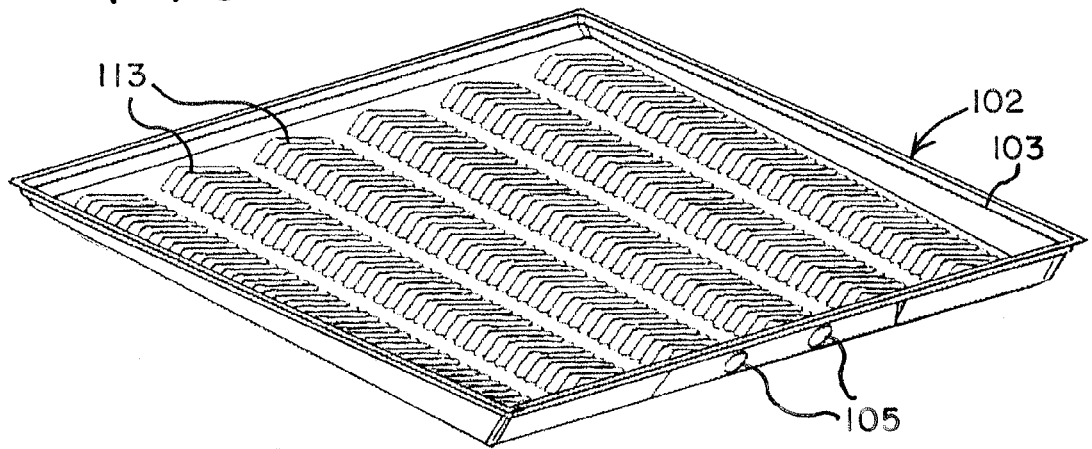
FIG. 15 is a top perspective view of the top sheet used as the ice tray in the heat exchanger of FIG. 12.
Figure 16:
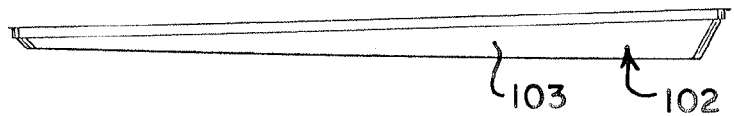
FIG. 16 is a side elevation view of the top sheet of FIG. 15.

FIGS. 12-26 show another heat exchanger 100 made according to the present invention. Like heat exchangers 30, 50 and 80, heat exchanger 100 is made from sheets of heat transfer material, including first sheet 102, second sheet 104, third sheet 106, fourth sheet 108 and fifth sheet 110 (FIG. 14). Heat exchanger 100 further includes sheets 112 and 114, which may be made out of heat transfer material, but do not necessarily need to be. The sheets 102, 104, 106, 108 and 110 are each separated by a space in which fluid channels are formed by dividers which are formed by stampings in the sheets. Six flow channels are created between each set of sheets 102 and 104, 104 and 106, 106 and 108, 108 and 110, and 110 and 112. In this embodiment, sheet 112 is a separator plate, and sheet 114 is a manifold plate. Each of the second, third, fourth and fifth sheets 104, 106, 108 and 110 of heat transfer material and the separator plate 112 comprise holes through which fluid may pass through the sheets. FIGS. 24-26 show how the fluids move through some of the different sets of holes.

The first sheet 102, like sheet 32, may be used to form the bottom of the ice bin 14. To properly hold the ice while it melts, the first sheet 102 includes a flange 103 around its perimeter and extending away from the second sheet 104. The first sheet 102 includes at least one, and preferably two melt water drain holes 105 (FIG. 15) through the flange 103. Sheet 102 has a sloped bottom surface (FIG. 16) to facilitate water from the melting ice flowing toward the drain holes 105. Sheet 102 includes six rows of chevrons 113 embossed upwardly in the sheet. As will be explained below, the chevrons in five of the rows are part of the flow path for non-carbonated water, and one row is part of the path for chilling carbonated water.

The sheets 104, 106, 108 and 110 are stamped with rows of chevrons 113 and dividers (barriers) of an identical shape for each plate, but the sheets are arranged in the heat exchanger 100 so as to be in different orientations. In this regard, the barriers formed on the sheets are different on the left side of the sheet compared to those on the right side of the sheet. The different barriers shapes are best seen in FIGS. 24-26. Looking specifically at far right section of FIG. 24, it can be seen that the barrier on sheets 106 and 110 each have one projection 109, while the barrier on sheets 104 and 108 are made with two projections 111. The projections 111 are spaced far enough apart that they have a flat area between them slightly larger than the upper surface of projection 109. This allows the projection 109 of sheet 110 to seal against the bottom of sheet 108. In turn, the projections 11 of sheet 108 seal against the bottom of sheet 106 on the surfaces to the side of projection 109.

Figure 17:
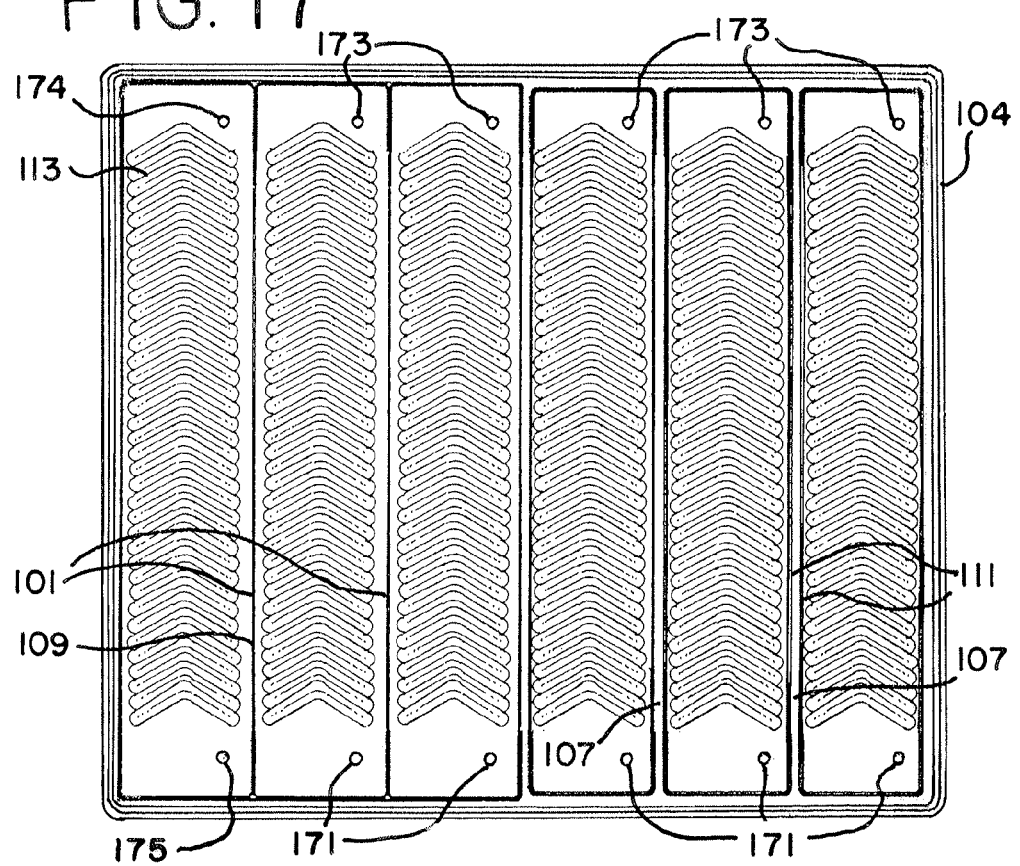
FIG. 17 is a top plan view of the second sheet in the heat exchanger of FIG. 12.
Figure 18:
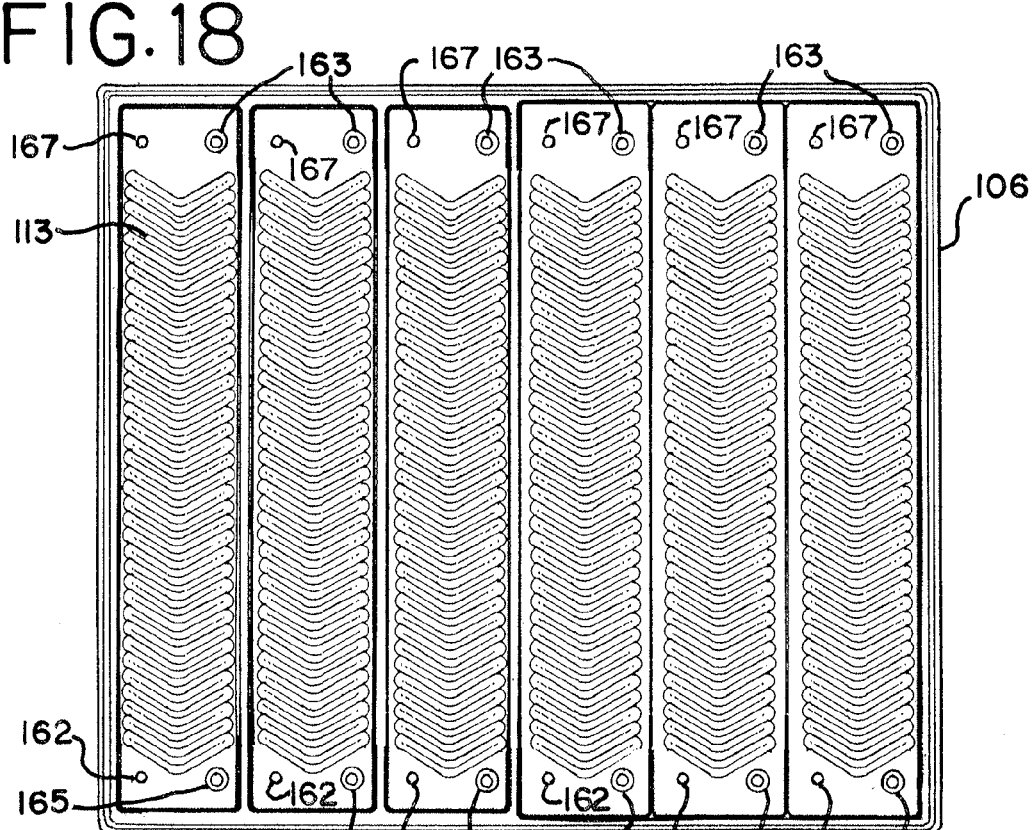
FIG. 18 is a top plan view of the third sheet in the heat exchanger of FIG. 12.
Figure 19:
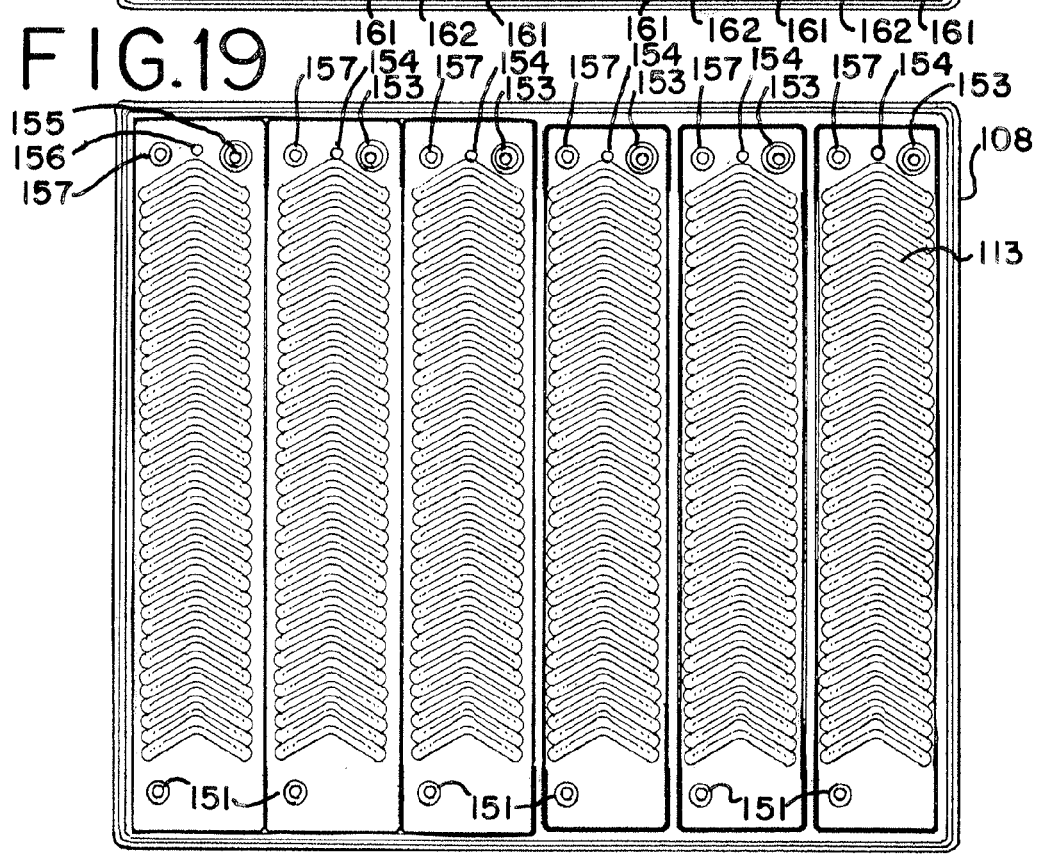
FIG. 19 is a top plan view of the fourth sheet in the heat exchanger of FIG. 12.

As can be seen in FIG. 17, the barrier 107 made with two projections 111 is used on one half of the sheet and the barrier 101 with one projection is used on the other half of the sheet. When the sheets are switched in their orientation to construct the heat exchanger 100, the left side of every other sheet will now be on the right side of the heat exchanger, and thus sandwiched between sheets still oriented in their original direction. This will put the barriers 101 on every other sheet on the same side of the heat exchanger as the barriers 107 on the remaining sheets.

Each sheet 104, 106, 108 and 110 has a flange 123 around its perimeter (best seen in FIGS. 24-26) to provide stiffness to the sheet. The sheets have different hole placements depending on which layer they provide. The hole placement differences are made by using tooling inserts in the stamping equipment to provide holes, small embossed rings, large embossed rings and partial chevrons as necessary to accommodate fluid inlets, outlets and transverse flow passageways. For small volume production of heat exchangers, this design helps to keep the cost of the heat exchanger lower than if each sheet were stamped from an independent tooling. However, by orienting the sheets in different directions, the sheets can be stacked on top of one another and brazed together such that the barriers 101 and 107 overlie one another on adjacent sheets. The reversal of the direction of the chevrons resulting from this reorientation of half the sheets also helps to ensure turbulent flow, and thus good heat transfer at the sheet surfaces.

The flow channels defined between the sheets are for different syrups, non-carbonated and carbonated water. These different fluids reach their flow channels, and return there from, controlled by the holes in the sheets 104, 106, 108 and 110. The space between sheets 102 and 104 is used to chill water, both carbonated and non-carbonated. The space between sheets 104 and 106 is used to chill a first set of six different syrups. The space between sheets 108 and 110 is used to chill a second set of six different syrups. The space between sheets 106 and 108 has water flow channels, which connect with the water flow channels between sheets 102 and 104, thus bringing cooled water down into the heat exchanger to cool the syrups in the flow channels between sheets 108 and 110. No useable flow channels are defined between sheets 110 and 112.

Figure 22:
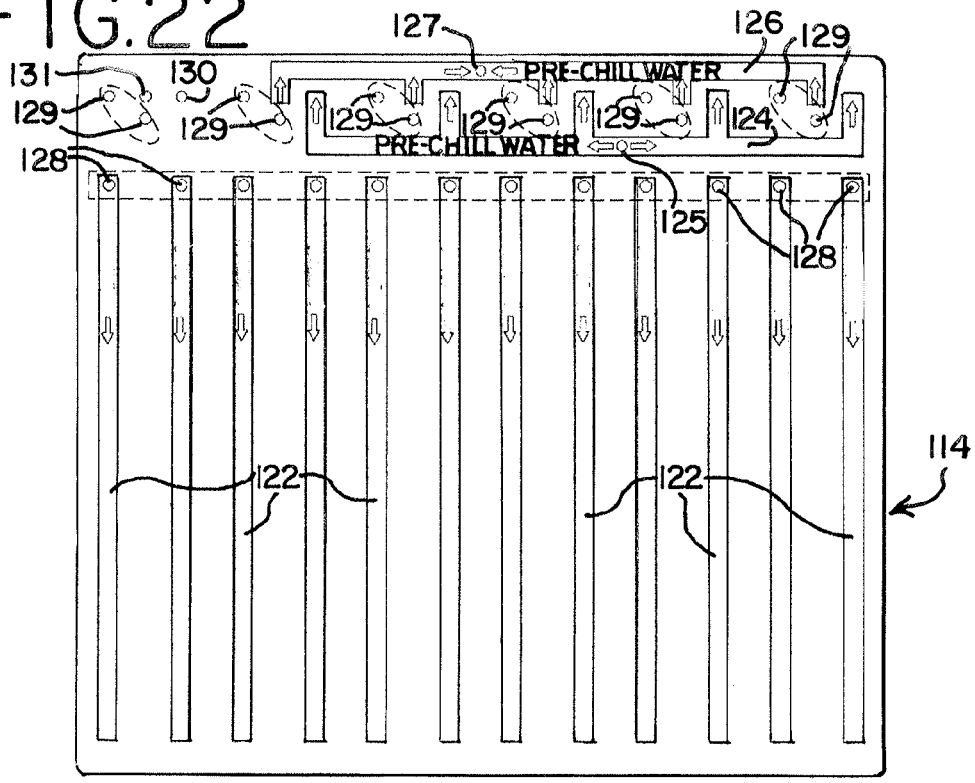
FIG. 22 is a top plan view of the seventh sheet in the heat exchanger of FIG. 12, providing manifold channels.
Figure 23:
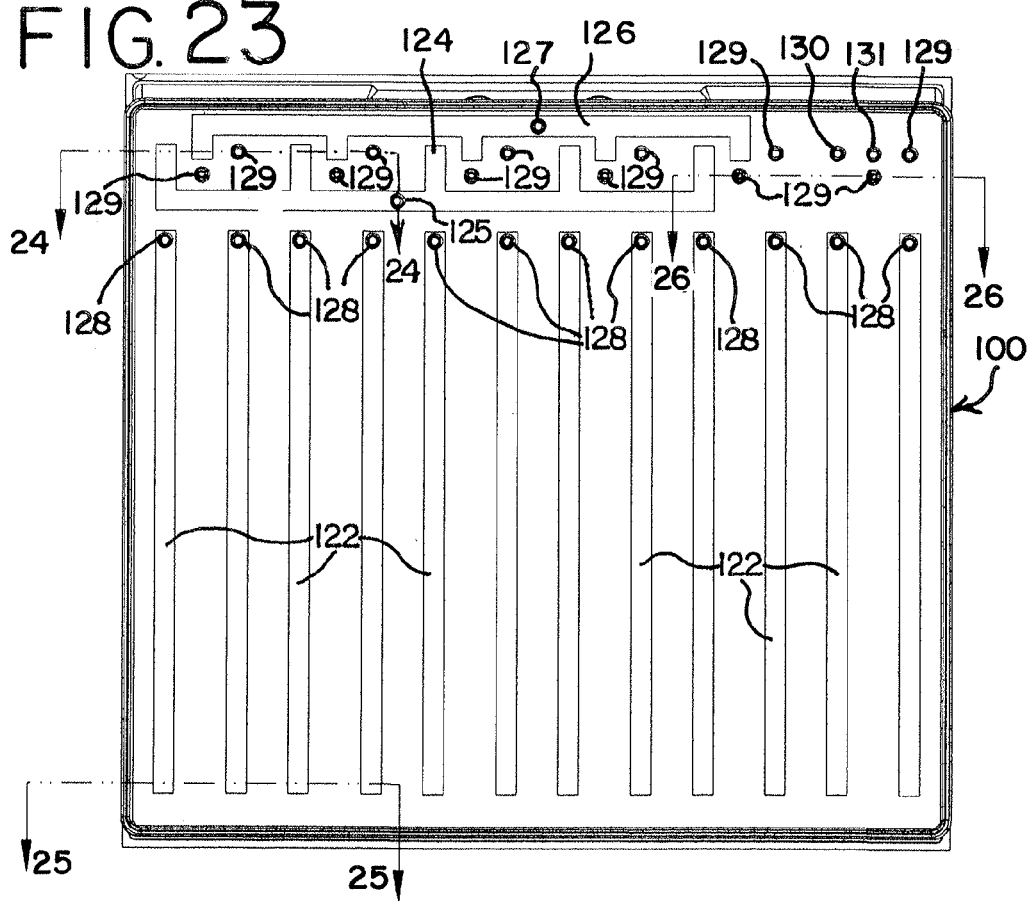
FIG. 23 is a bottom plan view of the heat exchanger of FIG. 12.

While the sheets 102, 104, 106, 108 and 110 preferably have rows of chevron shapes stamped in them, the separator plate 112 is flat (FIG. 21). The manifold plate 114 does not include chevrons, but does include depressions 122, 124 and 126 forming multiple, separate flow channels in the space between the depressions and the separator plate 112, as best seen in FIGS. 13, 22 and 23. Multiple different syrups, such as syrups for twelve different beverages, enter the twelve flow channels 122 shown in FIGS. 13 and 22 through syrup inlet connectors 128, and exit the heat exchanger through syrup outlets 129. Prechill water (water that is chilled before being carbonated) enters manifold depression 124 though inlet 125. The non-carbonated water is collected by manifold depression 126 and exits the heat exchanger through outlet 127. Carbonated water enters through connector 130 and exits through connector 131. In this embodiment, all syrup and water connections connect to the manifold plate 114 and are located near the front of the heat exchanger.

The two depressions 124 and 126 form two separate manifold channels that each fluidly connect with multiple holes 133 and 134 in the separator sheet 112. Non-carbonated water entering through connector 125 fills manifold depression 124 and then passes upwardly through separator plate 112 using holes 133. After it is chilled, it passes through holes 134 to enter manifold depression 126, before exiting the heat exchanger through outlet connector 127. The carbonated water entering through connector 130 passes though hole 135 upwardly into the heat exchanger, and when it exits, passes though hole 136 into connector 131. Each of the other holes 137 and 139 in the front portion of the separator plate are used for syrup exiting the heat exchanger, while holes 132 and 138 in the rear portion of the separator plate connect with syrup channels 122, allowing the syrup to pass upward through separator plate 112.

Considering just the flow channels on the left side (from the perspective of FIGS. 14, 24 and 25) of the heat exchanger 100, a first syrup enters through connection 128 (FIG. 14) and flows toward the rear of the heat exchanger in the depression 122. From there it passes upwardly through hole 132 in separator plate 112 and hole 141 in sheet 110, as depicted by arrow 186 (FIG. 25), and then flows back toward the front of the heat exchanger in the flow channel created between sheets 108 and 110. When it reaches the front of the heat exchanger, the syrup passes through holes 147 and 137 and out connection 129. Five other syrups from the first set of syrups flow in the same way through the other channels in between these same sheets, starting in the third (see arrow 189, FIG. 25), fifth, seventh, ninth and eleventh depressions 122, counting from left to right across sheet 114. FIG. 26 shows the last two of these syrup flow paths exiting from the layer between sheets 108 and 110 on the right side of the heat exchanger, following the path of arrows 192 and 193.

Another syrup, from the second set of syrups, enters the depression 122 second in from the left side and flows towards the back of the heat exchanger. However, this syrup must pass up to the space between sheets 104 and 106. To do so it passes up through holes 138, 142, 151 and 162, as depicted by arrow 188 (FIG. 25). It is cooled as it flows toward the front of the heat exchange, where it passes back down through holes 167 (arrow 182, FIG. 24), 157, 146 and 139 and out connection 129. This route of going up to the space between sheets 104 and 106 to be cooled is the same for the other five syrups in the second set of syrups. This upward and downward passage for another of the syrups in this second set of syrups is shown by arrow 191 in FIG. 25 and arrow 185 in FIG. 24.

Noncarbonated water enters through connection 125 and is distributed by manifold depression 124 between five different flow paths through the heat exchanger. Again looking at the flow channels on the left side of the heat exchanger 100, as shown in FIG. 24 by arrow 180, water passes upward from the manifold depression 124 though holes 133, 143, 153, 163 and 173 along the front side of the heat exchanger to the top layer of the heat exchanger, between sheets 102 and 104. From here the water flows toward the back of the heat exchanger, giving off heat to melting ice through contact with sheet 102. The water then passes down two levels, though holes 171 and 161 (see arrow 187, FIG. 25), where it flows back toward the front of the heat exchanger, where it passes downwardly through holes 154, (see arrow 181, FIG. 24) 144 and 134 into the manifold depression 126 and exits through connection 127. Each of the five noncarbonated water flow paths follow the same process of flowing up to the top space in the heat exchanger, across the heat exchanger, and then down to the middle of the heat exchanger, where it goes back across to the front. Arrows 183 and 184 in FIG. 24 and arrow 190 in FIG. 25 depicts the second of the other four similarly configured water flow paths.

The carbonated water does not utilize a manifold, but rather has its own inlet and outlet connections and just one flow path through the heat exchanger. That flow path is like the flow path of the carbonated water, and uses flow channels through the top and third spaces in the heat exchanger. Carbonated water enters through connection 130 and passes upward through holes 135, 148, 155, 165 and 174 into the space between sheets 102 and 104 on the right side of the heat exchanger. From there it travels towards the back of the heat exchanger, giving off further heat to the melting ice sitting on top of sheet 102 in a final chilling operation. From there it passes down through holes 175 (FIG. 17) and 165 (FIG. 18) into the space between sheets 106 and 108. The carbonated water flows back to the front of the heat exchanger, and passes through holes 156, 149 and 136 and out through connection 131.

The heat exchanger 100 is made by first stamping the separate sheets, then arranging them in the correct order, with a thin layer of brazing material between each sheet. The sheets are held in their proper orientation and heated until the brazing sheets melt. The brazing material naturally flows to areas where the sheets contact one another. These areas of contact have, of course, been designed to be the places where a liquid tight seal is needed.

Figure 27:
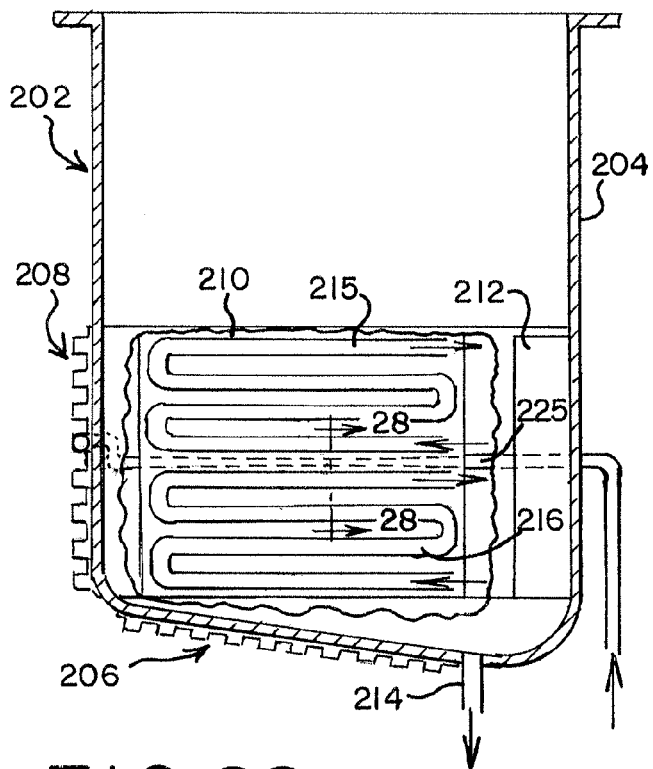
FIG. 27 is a schematic partial cross-section view of the ice bin and heat exchanger portion of a first alternate embodiment of an ice and beverage dispenser.
Figure 28:
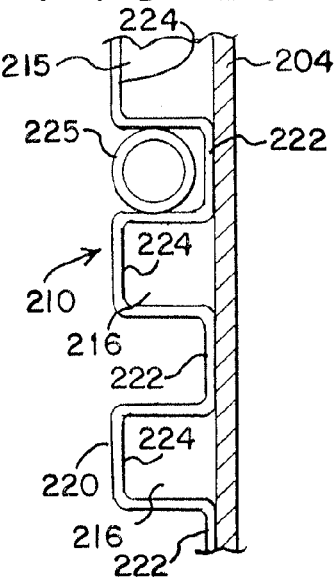
FIG. 28 is a cross-sectional view taken along line 28-28 of FIG. 27.

FIGS. 27-30 show additional heat exchanger designs of the present invention, some of which can be located in other areas of a beverage dispenser than underneath the ice bin. The ice bin and heat exchanger portion of a first alternate embodiment of an ice and beverage dispenser 202 is shown in FIGS. 27 and 28. In this embodiment, the wall and floor portions of the ice bin are themselves used as one of the sheets in the heat exchanger. The ice bin 204 can be a one piece, deep draw formed ice bin. Single layer heat exchangers are formed on three sides and the bottom of the ice bin 204. Heat exchanger 206 is formed on the bottom of the ice bin, and is used to cool water. Heat exchangers 208 and 210 are formed on the back and one side of the ice bin. Another heat exchanger (not shown) is formed on the opposite side of the ice bin from heat exchanger 208. These three heat exchangers are used to cool syrup. Preferably each of the heat exchangers 208 and 210 can cool more than one syrup. A carbonator tank 212 may also be included in the front of the ice bin 204, to provide cooling contact with the walls of the carbonator and the ice in the ice bin 204. A drain 214 is provided in the ice bin, and may pass through or be located in front of the heat exchanger 206.

The heat exchangers 206, 208 and 210 are made by first stamping a sheet 220 of heat transfer material, such as aluminum 3003 alloy, with ridges and depressions. The stamping may produce these ridges and depressions across the entire width of the sheet (in which case separate end sections will be added to connect different depressions into one flow channel), or more preferably the stamping will form a continuous depression that curves back and forth as shown in FIG. 27. If the latter concept is used, and two different syrups are to be cooled in the heat exchanger 210, then the stamping will produce two separate flow channels 215 and 216, as shown.

This sheet is then connected to the wall of the ice bin 204 by brazing. It is preferred that the ridges have a flat surface that will allow a large surface area for contact with the ice bin. One example design of such a stamped material connected to the ice bin is shown in FIG. 28. The sheet of heat transfer material 220 has ridges 222 and depressions 224 formed in it. The ridges 222 are connected to the wall of ice bin 204 by brazing. The depressions 224 create the fluid channels 215 and 216.

In the embodiment of FIG. 27, syrup is conveyed to the back heat exchanger 208 from the front side of the ice bin. Tubing 225 carrying that syrup passes between depressions forming the different syrup flow channels 215 and 216, as seen in FIG. 28. The heat exchangers 206, 208 and 210 will typically include fittings onto which the tubing, such as tubing 225, may connect to deliver and carry away fluids cooled by the heat exchangers. (Not all such tubing and fittings are shown for sake of clarity).

Figure 29:
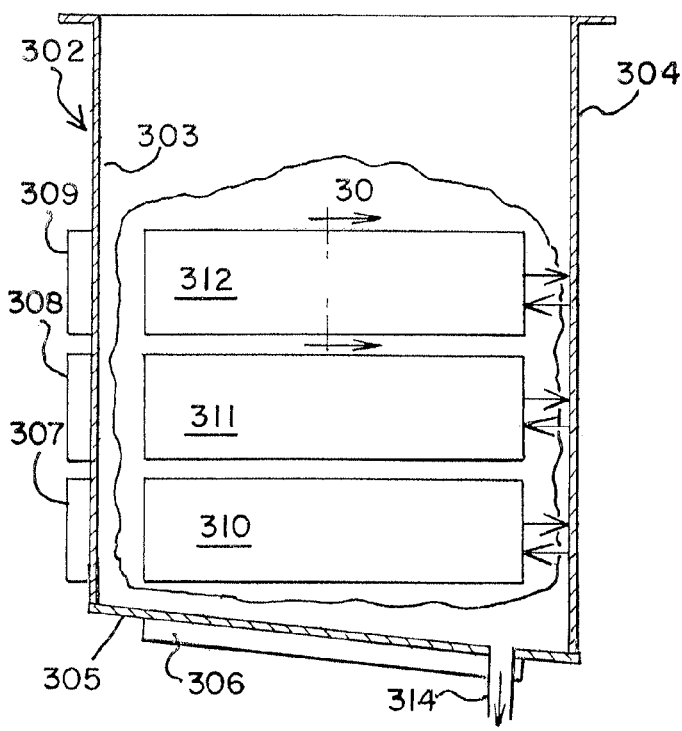
FIG. 29 is a schematic partial cross-section view of the ice bin and heat exchanger portion of a second alternate embodiment of an ice and beverage dispenser.
Figure 30:
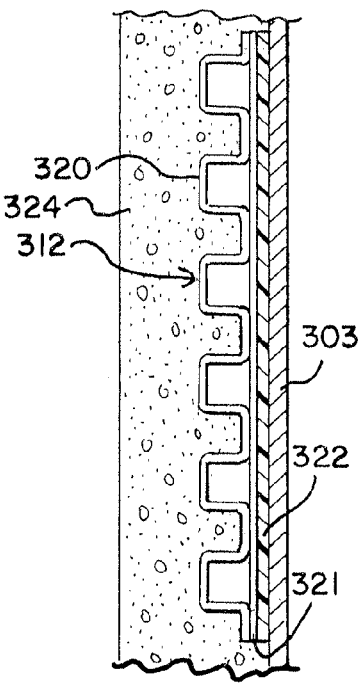
FIG. 30 is a cross-sectional taken along line 30-30 of FIG. 29.

The ice bin and heat exchanger portion of a second alternate embodiment of an ice and beverage dispenser 302 is shown in FIGS. 29 and 30. In this embodiment, the wall and floor portions of the ice bin are used to mount the heat exchangers, but the heat exchangers are formed as separate units and then connected to the ice bin 304 using a thermally conductive material. This avoids the need to have a very large oven that would be used in brazing the heat exchangers 206, 208 and 210 to ice bin 204. Also, in the embodiment shown in FIG. 29, the ice bin 304 is made by more traditional method of folding a flat piece of metal 303 with four folds to form a box. A separate piece of metal 305 is then connected to the box to form the bottom of the ice bin 304. A drain 314 is provided in a conventional manner. Heat exchanger 306 is attached to the bottom of the ice bin, and is used to cool water. Heat exchangers 307, 308 and 309 are connected to the rear of the ice bin 304. Heat exchangers 310, 311 and 312 are connected to the side wall of ice bin 304. Three additional heat exchangers could be connected to the other side wall (not shown). Heat exchangers 307-312 are used to cool beverage syrups.

Each the heat exchangers 306-312 are very similar to heat exchangers 206, 208 and 210 in that they are made with a stamped sheet of heat transfer material that has ridges and depressions formed in it. As shown in FIG. 30, however, the stamped sheet of heat transfer material 320 is brazed to a second sheet of heat transfer material 321 rather than directly to the metal from which the ice bin is formed. The sealed heat exchanger is then adhered to the ice bin 304 using a thermally conductive material 322, such as a mastic. PM-8 thermal mastic sold by Virginia KMP Corporation, Dallas, Tex., may be suitable for this purpose. Once the heat exchangers 306-312 are attached to the ice bin 304, the ice bin may be covered with insulation 324. The foam insulation will help hold the heat exchanger into good thermal conductivity with the wall of the ice bin 304. While not shown in FIG. 28, of course heat exchangers 206, 208, 210 and ice bin 204 can also be covered by such insulation. While the heat exchangers 208, 210, and 307-312 are shown on the outside walls of the ice bin, they could also be placed on the inside surfaces of the ice bin. One advantage of the design of FIGS. 29 and 30 is their modular nature. For different models of beverage dispensers, a different number of syrups will need to be cooled. The heat exchangers 307-312 can be identical, and the beverage dispenser constructed with a larger or smaller number of heat exchanges shown, depending on the number of syrups to be cooled for that model.

Heat exchangers attached to the wall of the ice bin, such as heat exchangers 208 or 308, may of course be used in conjunction with heat exchanger 30 or 100 in the bottom of the ice bin. These auxiliary heat exchanges would provide additional cooling pathways for syrups if the dispenser were going to dispense additional flavors of beverages besides the syrup cooled in heat exchanger 30 or 100. Alternatively, all syrup cooling could be achieved by auxiliary heat exchangers like 208 and 308, while the water cooling (carbonated, non-carbonated or both) was carried out in a heat exchanger similar to heat exchanger 30 or 100 at the bottom of the ice bin. An auxiliary heat exchanger such as heat exchanger 208 or 308 could also be used on the front of the ice bin located above the main heat exchanger and be used to route water and/or beverage concentrate lines from the main heat exchanger up to the mixing and dispensing valves. Such auxiliary heat exchangers would then help the dispenser provide drinks drawn on a casual basis, such as 30 minutes apart, to be properly chilled. Of course an auxiliary heat exchanger 208 or 308 could be used with a conventional aluminum block heat exchanger in the bottom of the ice bin.

FIGS. 31 and 32 depict portions of an ice bin and heat exchanger portion 402 of a third alternate embodiment of an ice and beverage dispenser. In this embodiment, the heat exchanger 404 is made from top sheet 410, which has flanges 403 and thus can be used as the ice holding portion, bottom sheet 420, and sheets of heat transfer material 412, 414, 416, 418 and 419 that are stamped in a similar corrugated form, with alternate sheets flipped 180° so that the corrugations go in opposite directions. Where the sheets 412, 414, 416, 418 and 419 contact one another, there is a large sheet-to-sheet surface contact 417. These contact areas 417 create dividers between flow passageways in the same layer, and promote heat transfer from the top sheet 410, which is in contact with the ice, to the sheets below it in the heat exchanger.

Where the corrugations go in opposite directions, so that the sheets do not contact one another, flow channels 431, 432, 433, 434, 435, etc. are formed. The bottom sheet 420 has fittings 422, 423, etc. attached. This sheet provides a manifold space between sheets 419 and 420 where water can enter and travel to different places. Dividers, not shown, will be used to divide this space up into the different manifold sections. Openings (not shown) in adjacent sheets can be used to transfer this water up to the space between sheets 410 and 412 where flow channels 431 are formed, much like holes 143, 153, 163 and 173 allow water to travel up from a manifold area in heat exchanger 100. Channels 432 may carry a first syrup, and channels 433 may carry a second syrup. Channels 434 and 435 may carry water that has been cooled first by flowing through channels 431. Again, holes though sheets (not shown) 412, 414, 416, 418 and 419 at different places throughout the heat exchanger 404 are used to connect these channels to appropriate inlet and outlet manifold sections and/or fittings. Different flow passageways can be used for carbonated and non-carbonated water, just as in heat exchanger 100.

Figure 33:
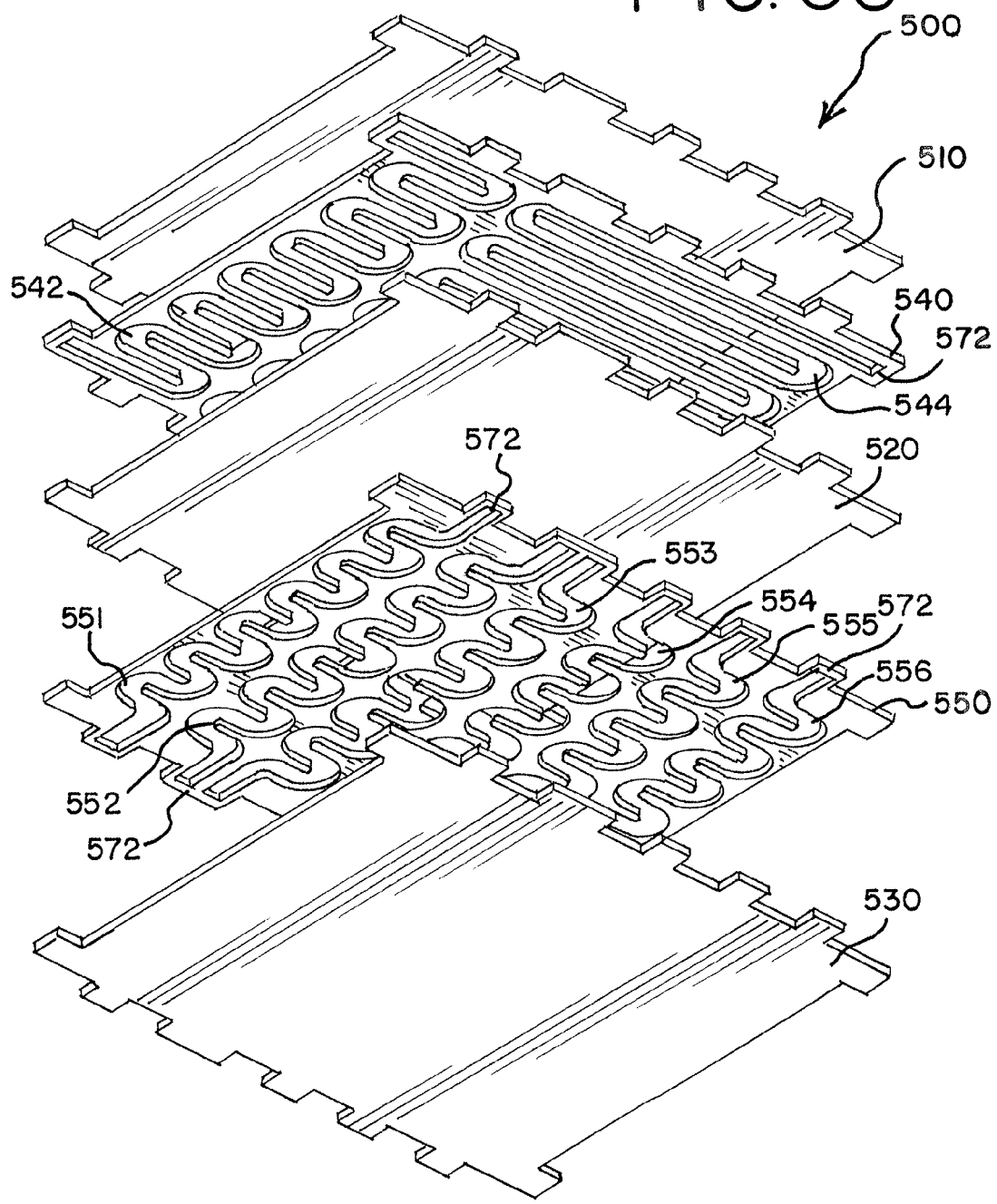
FIG. 33 is a perspective exploded view of another embodiment of a heat exchanger that could be used in the ice and beverage dispenser of FIG. 1.

Another embodiment of a heat exchanger 500 of the present invention is shown in FIG. 33. Like the other heat exchangers described above, heat exchanger 500 is made of multiple sheets of heat transfer material stacked on top of one another, with flow passageways between sheets for cooling water, syrup or other beverage components by ice resting on the uppermost sheet. However, in the heat exchanger 500 the flow passageways are made in one or more of the sheets that are then sandwiched between other sheets, and it is the thickness of the sheets that provides the flow passageways. Particularly, in making heat exchanger 500, first, second and third sheets of heat transfer material 510, 520 and 530 are provided. Meanwhile, at least two distinct passageways are formed in each of a fourth sheet of material 540 and in a fifth sheet of material 550. The fourth sheet of material 540 is sandwiched between the first 510 and second 520 sheets of heat transfer material such that the passageways in the fourth sheet of material 540 form first and second fluid flow channels 542 and 544. The fifth sheet of material 550 is sandwiched between the second 520 and third 530 sheets of heat transfer material such that the passageways in the fifth sheet of material 550 form at least third and fourth fluid flow channels, and preferable a total of six flow channels 551, 552, 553, 554, 555 and 556. Ice would preferably be in contact with sheet 510, and flow channel 544 may be used to cool non-carbonated water, while flow channel 542 is used to cool carbonated water, and flow channels 551-556 are each used to cool one of six different beverage concentrates.

The passageways are formed by stamping the passageways in the fourth and fifth sheets of material. When first stamped, the passageways do not communicate to the perimeter of the sheets; but rather terminate in blockages 572. After the sheets are sandwiched the blockages 572 may be removed and fittings attached to create inlets and outlets to the flow channels. Alternatively, inlets and outlets may be formed through sheet 530, as in other embodiments. The first through fifth sheets are sealed together at their perimeters by a method selected from the group consisting of brazing, laser welding, adhesive bonding and mechanical clamping with a gasket.

Each of the above described heat exchangers is able to use melting ice to cool at least one beverage or multiple beverage components without the use of a heavy cold plate. In most embodiments the heat exchanger includes a plurality of sheets of heat transfer material and at least first and second flow channels defined by surfaces made at least in part by the sheets of heat transfer material. First and second fluids, selected from the group consisting of non-carbonated water, carbonated water, beverage concentrates and non-concentrated beverages, are directed respectively through the first and second flow channels. Ice placed in contact with at least one of the sheets of heat transfer material melts and thereby cools the first and second fluids as they reside in and pass through their respective channels. In the heat exchangers 30, 100, 404 and 500, the heat exchanger further comprises third and fourth flow channels defined by surfaces made at least in part by the sheets of heat transfer material. Those third and fourth flow channels carry respectively third and fourth fluids.

Preferably the first fluid is carbonated water, the second fluid is a first beverage concentrate, the third fluid is non-carbonated water and the fourth fluid is a second beverage concentrate.

While the drawings have depicted the ice used to cool the heat exchangers as ice is in the form of a plurality of individual pieces of ice, the ice may alternately be in the form of ice crystals in a slurry. The slurry may be pumped through channels in the heat exchanger, or forced past an outside surface of the heat exchanger, rather than rest on top of the heat exchanger. This would still place ice in contact with at least one of the sheets of heat transfer material and melt the ice to thereby cool the non-carbonated water, carbonated water, first beverage concentrate and second beverage concentrate as they reside in and pass through their respective channels.

In the embodiments of heat exchanger 100 and 500, a majority, preferably between 65% and 85%, and perhaps approximately 75% of the area of the first sheet is used to transfer heat to cool non-carbonated water; whereas the balance, preferably between 15 and 35%, and perhaps approximately 25% of the area of the first sheet is used to transfer heat to cool carbonated water. Of course these ratios may be adjusted, but it is believed that the largest cooling load in the heat exchanger will be required to cool ambient non-carbonated water. This chilled water is then sent to the carbonator, and returned as carbonated water that is chilled in a separate passageway. Of course a portion of the chilled non-carbonated water may be used to mix with concentrates for non-carbonated beverages, such as lemonade, and part of it may be dispensed as chilled water. There may be some beverage dispensers that will only dispense non-carbonated beverages. In that case, all of the water used to mix with a beverage can be cooled in a common circuit, and no separate pathway through the heat exchanger will be needed for carbonated water. Alternatively, if only carbonated beverages are dispensed, and pre-chilling of water prior to it being carbonated is not needed, the heat exchanger will need only one water circuit, totally dedicated to carbonated water. Of course, even if only one water circuit is needed, that cooling circuit can be divided into multiple flow paths if desired.

The present invention also includes a method of constructing a heat exchanger for cooling multiple fluids. As seen above, one such method involves placing at least first, second and third sheets of heat transfer material in a stacked relationship, with the second sheet between the first and third sheets, leaving a first space between the first and second sheets and a second space, preferably stamped from the sheets themselves, between the second and third sheets. At least two dividers are provided, preferable stamped from the sheets themselves, the first forming at least first and third distinct passageways in the first space, and the second forming at least second and fourth distinct passageways in the second space. Inlet and outlet connections are provided, in fluid communication with the distinct passageways in the first and second spaces. Preferably fourth and fifth sheets of heat transfer material are also provided in the stacked relationship, and a third space is left between the third and fourth sheets, and a fourth space is left between the fourth and fifth sheets. In this form the two distinct passageways in the first space may be in fluid communication with distinct passageways formed in the third space, thus allowing chilled water to be used to cool additional beverage concentrates in the fourth space.

The fittings are preferably attached to the bottoms of the second and third sheets to form a plurality of inlets and outlets, one each of said inlets and outlets being in fluid communication with each of the four distinct passageways. In the embodiment of heat exchanger 100, the heat exchanger further comprises a separator plate and a manifold plate. In that embodiment the inlet and outlet connections are connected to the manifold plate.

Preferably the sheets of the heat exchanger are brazed together to form a seal at their periphery and to connect raised portions in one or more of the sheets to form the dividers. As noted above, the sheets may comprise holes through which fluid may pass through the sheets, and some of said holes are directly in line with one another. In that case the brazing also surrounds the in-line holes to seal the in-line holes to define a transverse passageway.

The dividers between the sheets of heat transfer material may be made from separate pieces, as in heat exchanger 500, but more preferably they are provided by stamped portions of the sheets. The dividers will typically separate the sheets by a distance of between 0.04 and 0.3 inches, preferable between 0.06 and 0.2 inches. In some embodiments, each of the sheets of heat transfer material comprise metal having a thickness of between about 0.01 and about 0.06 inches. In some embodiments, each sheet is less than 0.025 inches thick. However thicker sheets may be used to increase mass in the heat exchanger. In the sheets that have ridges in them, like chevrons 113, the ratio of the height of the highest ridge compared to the largest horizontal dimension of the sheets is less than about 3000, preferably less than about 1500, and more preferably less than about 600. If a sheet were 20 inches long and 19 inches wide, and had a ridge 0.1 inches high, the ratio would be 200. If the chevrons have the same height as the height of the dividers, then the sheets can be put together such that the chevrons in one sheet can contact the chevrons in the other sheet at multiple points, creating a tortuous flow path for the fluid, without causing too great of a pressure drop.

The sheets of heat transfer material are most preferably a highly thermally conductive material having a conductivity of at least 70 BTU/(hr-ft-° F.) (121 watts/(m-° K.)). such as copper or aluminum. As noted above, the sheets are preferable brazed together. If aluminum sheets are used, the brazing material will be an aluminum based alloy that has a lower melting point than the aluminum used to make the sheets. After the sheets are brazed together they are preferably coated with corrosion resistant coating. The coating may be a polymer, but when aluminum sheets are used the coating will preferably be applied using a plating technique, and use a plating material that is typically an alloy comprising mostly nickel or tin. The current, preferred embodiment of the invention is an aluminum construction, plated to prevent corrosion. Electroless nickel is the presently preferred plating processes. The aluminum heat exchanger will be brazed together before the parts are plated to protect the aluminum braze alloy from corrosion. Therefore, the chemical solutions for electroless nickel would be pumped through the brazed heat exchanger.

It should be understood that various changes and modifications to the presently preferred embodiments described herein will be apparent to those skilled in the art. For example, while the sheets used in the heat exchangers will typically comprise aluminum, stainless steel or laminate sheets made of aluminum and copper may also be used. Such changes and modifications can be made without departing from the spirit and scope of the present invention and without diminishing its intended advantages. It is therefore intended that such changes and modifications be covered by the appended claims.

The invention claimed is:

1. A method of cooling multiple beverage components comprising:

a) providing a heat exchanger comprising a plurality of sheets of heat transfer material and at least first and second flow channels defined by surfaces made at least in part by said sheets of heat transfer material;

b) directing a first and second fluid respectively through the first and second flow channels, each of the first and second fluids being selected from the group consisting of non-carbonated water, carbonated water, beverage concentrates and non-concentrated beverages;

c) placing ice in contact with at least one of the sheets of heat transfer material; and d) melting the ice and thereby cooling the first and second fluids as they reside in and pass through their respective channels.

2. The method of claim 1 wherein the heat exchanger further comprises third and fourth flow channels defined by surfaces made at least in part by said sheets of heat transfer material; and wherein carbonated water is directed through said first flow channel, non-carbonated water is directed through said third flow channel, a first beverage concentrate is directed through said second flow channel and a second beverage concentrate is directed through said fourth flow channel.

3. The method of claim 2 wherein the plurality of sheets of heat transfer material comprises at least first, second and third sheets of heat transfer material, and the first and third flow channels are formed between the first and second of said sheets; and the second and fourth channels are formed between the second and third of said sheets.

4. The method of claim 3 wherein the ice is in contact with the first sheet.

5. The method of claim 4 wherein the melting ice cools the non-carbonated water, carbonated water, first beverage concentrate and second beverage concentrate as they reside in and pass through their respective channels by: fluid in the first flow channel being cooled by heat transfer of the melting ice through the first sheet, and the fluid in the first channel in turn cooling fluid in second channel by heat transfer through the second sheet of heat transfer material.

6. The method of claim 3 wherein a majority of the area of the first sheet is used to transfer heat to cool the non-carbonated water and the balance of the area of the first sheet is used to transfer heat to cool the carbonated water.

7. The method of claim 1 wherein the surfaces defining the flow channels are provided by a stamped form in at least one of the sheets that includes depressions, the sheets being connected together such that the depressions in the at least one sheet produce the flow channels when the sheets are connected together.

8. The method of claim 1 wherein the first and second fluids are both non-concentrated beverages.

9. The method of claim 1 wherein at least one of the first and second fluids comprises beer.

10. The method of claim 1 wherein the sheets of heat transfer material comprise metal.

11. The method of claim 1 wherein the sheets of heat transfer material comprise aluminum.

12. The method of claim 1 wherein the sheets of heat transfer material comprises laminated material.

13. A beverage dispensing system comprising a plurality of beverage dispensing valves and a heat exchanger that is configured to cool beverage components dispensed through the valves by the melting of ice in contact with the heat exchanger, the heat exchanger comprising: a plurality of sheets of heat transfer material and at least first and second flow channels defined by surfaces made at least in part by said sheets of heat transfer material, said first and second flow channels each carrying a separate beverage component.

14. The beverage dispensing system of claim 13 wherein the valves and heat exchanger are part of a single piece of dispensing equipment, and the ice is contained in the piece of dispensing equipment in contact with the heat exchanger.

15. The beverage dispensing system of claim 13 further comprising an ice storage bin combined with an ice dispenser, wherein the ice storage bin comprises an ice dispensing aperture and the dispenser includes an ice dispensing chute connected to the storage bin in proximity to the ice dispensing aperture.

16. The beverage dispensing system of claim 13 wherein the heat exchanger comprises a) at least first, second and third sheets of heat transfer material arranged in a generally parallel relationship and sealed together at their periphery; b) at least one first divider located between the first and second sheets of heat transfer material so as to form said at least first and second distinct flow channels in the space between the first and second sheets; c) at least one second divider located between the second and third sheets so as to form at least third and fourth distinct flow channels in the space between the second and third sheets; and d) connections configured to connect first and second water lines and first and second beverage concentrate lines respectively to the first, second, third and fourth flow channels.

17. The beverage dispensing system of claim 16 wherein the first and second dividers are provided by portions of one or more of the first, second and third sheets.

18. The beverage dispensing system of claim 16 further comprising at least a fifth flow channel and at least one manifold in the heat exchanger connecting at least the first and fifth flow channels together.

19. The beverage dispensing system of claim 16 wherein the at least first, second and third sheets are bonded together to form said seal at their periphery and to connect raised portions in one or more of the sheets to form said dividers.

20. The beverage dispensing system of claim 16 further comprising fourth and fifth sheets of heat transfer material, a separator plate and a manifold plate, and wherein said connections connect to the manifold plate and wherein each of the second, third, fourth and fifth sheets of heat transfer material and the separator plate comprise holes through which fluid may pass through the sheets and separator plate, and some of said holes are directly in line with one another and brazing surrounds said in-line holes to seal the in-line holes to define a transverse passageway.

21. The beverage dispensing system of claim 16 wherein one of more of said first, second and third sheets also comprise depressions that form flow inhibitors in at least one of the flow channels, and the depressions are in the form of chevrons.

22. The beverage dispensing system of claim 13 further comprising a carbonator and an ice bin, and the plurality of beverage dispensing valves comprise a plurality of mixing and dispensing valves.

23. The beverage dispensing system of claim 13 wherein the sheets of heat transfer material are brazed together.

24. The beverage dispensing system of claim 13 wherein the sheets of heat transfer material are coated with corrosion resistant coating.

25. The beverage dispensing system of claim 13 wherein the sheets of heat transfer material comprise a material selected from the group consisting of copper and aluminum, and are brazed together, and are thereafter plated.

26. A method of constructing a heat exchanger for cooling one or more beverage components comprising the steps of: a)

stamping a sheet of heat transfer material into a form with ridges and depressions; b) connecting the stamped sheet of heat transfer material onto a surface of an ice storage bin with a heat conductive connection such that the ridges are attached to a surface of the bin and the depressions form flow channels formed in part by the surface of the ice bin, and c) connecting fittings to the heat transfer material in fluid connection with the flow channels.

* * * * *